(12) United States Patent
Furumoto

(10) Patent No.: US 10,288,769 B2
(45) Date of Patent: May 14, 2019

(54) WEATHER FORECASTING SYSTEM

(71) Applicant: METROWEATHER CO., LTD., Uji-shi, Kyoto (JP)

(72) Inventor: Junichi Furumoto, Kyoto (JP)

(73) Assignee: METROWEATHER CO., LTD., Uji-shi, Kyoto ( * ) Notice: Subject to any disclaimer, the term of this patent is extended or adjusted under 35 U.S.C. 154(b) by 0 days.

(21) Appl. No.: 15/314,411

(22) PCT Filed: May 28, 2015

(86) PCT No.: PCT/JP2015/002696
§ 371 (c)(1),
(2) Date: Nov. 28, 2016

(87) PCT Pub. No.: WO2015/182142
PCT Pub. Date: Dec. 3, 2015

(65) Prior Publication Data
US 2017/0192128 A1 Jul. 6, 2017

(30) Foreign Application Priority Data

May 28, 2014 (JP) .................................. 2014-110642

(51) Int. Cl.
*G01S 7/48* (2006.01)
*G01W 1/10* (2006.01)
(Continued)

(52) U.S. Cl.
CPC ............ *G01W 1/10* (2013.01); *G01S 7/4808* (2013.01); *G01S 17/58* (2013.01); *G01S 17/87* (2013.01);
(Continued)

(58) Field of Classification Search
CPC ........ G01S 17/95; G01S 17/58; G01S 7/4808; G01W 1/10
See application file for complete search history.

(56) References Cited

U.S. PATENT DOCUMENTS

| 7,983,834 B2 * | 7/2011 | Blumendeller ........ F02M 26/47 123/568.12 |
| 2012/0084006 A1 * | 4/2012 | Kawaguchi ........... G01L 9/0022 702/3 |

FOREIGN PATENT DOCUMENTS

| JP | 2004-61416 A | 2/2004 |
| JP | 2009-52976 A | 3/2009 |

(Continued)

OTHER PUBLICATIONS

Takahashi et al., "Discussion About the Predictability of Short-Duration Heavy Rainfall in the Tokyo Metropolitan Area Based on Careful Monitoring of Surface Wind", Taikai Koen Yokoshu, vol. 105, Apr. 30, 2014, p. 136, see International Search Report and Written Opinion.

(Continued)

*Primary Examiner* — Bryan Bui
(74) *Attorney, Agent, or Firm* — Hamre, Schumann, Mueller & Larson, P.C.

(57) ABSTRACT

Provided is a weather forecasting system for predicting a weather phenomenon in a prediction target region. The weather forecasting system includes a storage unit and a first calculation unit. The storage unit stores wind-condition information and measured weather information. The wind-condition information is information obtained from an air observation system using Doppler LIDAR. The first calculation unit generates predicted weather information including presence of a local downpour, based on information related to wind convergence included in the wind-condition (Continued)

information and information related to instability of air included in the measured weather information.

14 Claims, 16 Drawing Sheets

(51) Int. Cl.
    *G01S 17/58*     (2006.01)
    *G01S 17/95*     (2006.01)
    *G01W 1/00*     (2006.01)
    *G06Q 10/04*     (2012.01)
    *G06Q 50/10*     (2012.01)
    *G01S 17/87*     (2006.01)

(52) U.S. Cl.
    CPC .............. *G01S 17/95* (2013.01); *G01W 1/00* (2013.01); *G06Q 10/04* (2013.01); *G06Q 50/10* (2013.01); *Y02A 90/19* (2018.01)

(56) References Cited

FOREIGN PATENT DOCUMENTS

| JP | 2013-16065 A | 1/2013 |
|---|---|---|
| JP | 2013-253910 A | 12/2013 |

OTHER PUBLICATIONS

International Search Report and Written Opinion, International Patent Application No. PCT/JP2015/002696, dated Aug. 25, 2015, with English translation (21 pages).

\* cited by examiner

WEATHER FORECASTING SYSTEM

TECHNICAL FIELD

The present invention relates to a database system for predicting a weather phenomenon, a computer program for causing a computer to execute the database system, an air observation system, a weather forecasting system, and a weather information providing system.

BACKGROUND ART

"Extreme weather", such as a local downpour that may be called torrential rain, is a weather phenomenon that causes serious damage to human and material in an extremely limited region. The damage becomes more serious as a population density increases, and in particular, in an urban area on which human activities are concentrated, the damage may become extremely conspicuous.

Also, an unprecedented aging society is currently progressing rapidly in Japan, and population concentration is progressing on cities where life is convenient. Moreover, a rise in an urbanization rate is posing a problem worldwide as well, and it is said that the urbanization rate, which is 50% as of 2013, is likely to reach 70% in 2050.

Meanwhile, prediction accuracy of extreme weather in a limited region is only about several percent under present circumstances, and improvement in the prediction accuracy is highly desired.

Therefore, improvement in numerical weather forecast is promoted for purposes of finely predicting weather information in a small region (for example, refer to Patent Literature 1).

CITATION LIST

Patent Literature

Patent Literature 1: Unexamined Japanese Patent Publication No. 2003-21687

SUMMARY OF THE INVENTION

Technical Problems

However, the fact is that an accurate forecasting model of extreme weather has not been implemented.

A possible reason is that occurrence and development of a small-scale weather phenomenon like extreme weather are greatly affected by wind speed fluctuation in a region near the ground where reproducibility by a numerical prediction model is low, and that air turbulence indicating random behavior plays a larger role in this region, and thus prediction thereof is theoretically difficult by deterministic prediction using a normal weather forecasting model.

Also, even if an optimal forecasting model is constructed, since wind speed fluctuation in the region near the ground is likely to be affected by the condition on the ground (surface roughness), it is considered difficult to continue highly accurate forecast continuously by the forecasting model in an area like a city area (in particular, urban area) where construction and demolition of buildings are performed every day and the condition on the ground changes from moment to moment.

Solution to Problems

Therefore, the inventor of the present invention has studied weather forecast by a method with a probabilistic approach different from the deterministic prediction using the weather forecasting model. Then, the present inventor has found out that wind-condition pattern information acquired based on an observation result by Doppler LIDAR is useful for prediction of a weather phenomenon, and has completed the present invention.

A weather forecasting system of the present invention is a weather forecasting system for predicting a weather phenomenon in a prediction target region, and includes: a storage unit; and a first calculation unit, wherein the storage unit stores wind-condition information and measured weather information, the wind-condition information is information obtained from an air observation system using Doppler LIDAR, and the first calculation unit generates predicted weather information including presence of a local downpour, based on information related to wind convergence included in the wind-condition information and information related to instability of air included in the measured weather information.

The measured weather information can be information related to a measured value observed regarding weather, such as the measured value itself, or an analyzed value on which objective analysis is performed based on the measured value or the like, or both.

This enables accurate forecast of extreme weather such as a local downpour.

Also, in the weather forecasting system of the present invention, the first calculation unit is configured to perform a process for determining presence of the local downpour by calculating occurrence probability of the local downpour only when determination is made that the air is unstable based on the measured weather information.

This enables reduction in unnecessary calculation time and efficient prediction.

Also, in the weather forecasting system of the present invention, weighting is performed to each of the wind-condition information and the measured weather information, and the weighting to the wind-condition information is set to be heavier than the weighting to the measured weather information.

This enables more accurate prediction.

Also, in the weather forecasting system of the present invention, the wind-condition information is divided into regions smaller than regions divided in the measured weather information for acquisition, and forecast information is output for each of the small regions.

This enables output of forecast of a local downpour or the like in each small region and improvement in convenience of users.

A database system of the present invention is a database system for predicting a weather phenomenon in a prediction target region, including: a storage unit; and a first calculation unit, wherein the storage unit stores wind-condition pattern information and measured weather information observed in the prediction target region, the wind-condition pattern information is information created based on wind-condition distribution information that is in the prediction target region and that is obtained by an air observation system using Doppler LIDAR, the wind-condition pattern information and the measured weather information are associated with each other and stored in the storage unit, the first calculation unit compares wind-condition pattern information at a time of prediction with the wind-condition pattern information stored in the storage unit to extract the wind-condition pattern information that is stored in the storage unit and that is relevant to the wind-condition pattern information at a time of prediction, and based on the measured weather information associated with the extracted wind-condition pattern information, the first calculation unit generates predicted weather information.

According to the database system of the present invention, the storage unit of the database system stores the wind-condition pattern information and the measured weather information, and the wind-condition pattern information and the measured weather information are associated with each other and stored. At a time of prediction, the wind-condition pattern information that is relevant to newly acquired predicted wind-condition pattern information is extracted from the storage unit, and based on the measured weather information associated with this extracted wind-condition pattern information, predicted weather information is generated. Therefore, the amount of information stored in the storage unit increases with passage of time, leading to improvement in prediction accuracy.

Also, in the database system of the present invention, new information is to be successively stored in the storage unit, and even if a situation of the ground surface or the like changes in the prediction target region, information in response to the change will be newly stored. Therefore, even if the situation of the ground surface or the like changes, the weather phenomenon can always be predicted accurately, and the database system is suitable for using an area where construction and demolition of structures are performed every day like a city area (in particular, urban area) and where the condition on the ground surface changes from moment to moment as the prediction target region.

Furthermore, the database system of the present invention generates the predicted weather information based on the wind-condition pattern information created based on the observation result of the Doppler LIDAR. Therefore, prediction of the weather phenomenon is performed in consideration of wind-speed variation in a region near the ground or air turbulence that shows random behavior in this region, enabling prediction of a local weather phenomenon.

In the database system of the present invention, preferably, the storage unit stores a Bayesian network including at least the wind-condition pattern information, nodes with the measured weather information observed in the prediction target region and the prediction target weather phenomenon as random variables, priori probabilities or posteriori probabilities regarding the random variables of the nodes, and a link between the nodes, and the first calculation unit generates the predicted weather information based on the wind-condition pattern information at a time of prediction and the posteriori probabilities extracted from conditional probability tables held in the nodes with the prediction target weather phenomenon as the random variables.

Such a database system predicts the weather phenomenon using the Bayesian network. In this case, the probability tables indicating priori probabilities and posteriori probabilities held in the nodes that constitute the Bayesian network are updated as needed, and the weather phenomenon is predicted based on the probability tables updated with passage of time, enabling more accurate prediction of the weather phenomenon with passage of time.

In the database system of the present invention, preferably, the storage unit further stores corresponding potential temperature pattern information, the corresponding potential temperature pattern information is information created based on altitude distribution of corresponding potential temperature in the prediction target region, the corresponding potential temperature pattern information and the measured weather information are associated with each other and are stored in the storage unit, the first calculation unit compares corresponding potential temperature pattern information at a time of prediction with the corresponding potential temperature pattern information stored in the storage unit to further extract the corresponding potential temperature pattern information that is stored in the storage unit and that is relevant to the corresponding potential temperature pattern information at a time of prediction, the first calculation unit generates the predicted weather information based on the measured weather information associated with the extracted wind-condition pattern information and the measured weather information associated with the extracted corresponding potential temperature pattern information.

In this case, in addition to the wind-condition pattern information, the predicted weather information is generated in consideration of the corresponding potential temperature pattern information in the prediction target region, enabling more accurate prediction of the weather phenomenon in the prediction target region.

Note that in the database system, when the corresponding potential temperature pattern information is stored in the storage unit and the weather phenomenon is predicted using the Bayesian network, the nodes with the corresponding potential temperature pattern information as random variables are preferably included in the Bayesian network.

Preferably, the database system of the present invention further includes a second calculation unit, wherein the second calculation unit compares the predicted weather information generated by the first calculation unit with the weather phenomenon that actually occurs to generate prediction accuracy information, and the storage unit stores the prediction accuracy information generated by the second calculation unit.

In this case, it becomes possible to generate the predicted weather information based on the prediction accuracy information as well stored in the storage unit, enabling more accurate prediction of the weather phenomenon in the prediction target region.

In the database system of the present invention, preferably, the air observation system is an air observation system including a plurality of the Doppler LIDARs installed with a space from each other, and a calculation unit (wind-condition calculation unit) configured to generate the wind-condition distribution information in the prediction target region based on an observation result by the Doppler LIDARs.

The wind-condition distribution information in the prediction target region acquired by such an air observation system is wind-condition distribution information with a small measurement error because the air observation system includes the plurality of Doppler LIDARs. By generating the predicted weather information using such wind-condition distribution information, accurately predicted weather information can be generated.

In the database system of the present invention, preferably, the wind-condition pattern information is wind-convergence pattern information and wind-speed pattern information, the measured weather information is at least rainfall information, and the predicted weather information is information on predicted local rainfall.

The wind-convergence pattern information and the wind-speed pattern information are information deeply reflecting influence of air turbulence that indicates random behavior. A local downpour (torrential rain) and a local total rainfall are weather phenomena of which prediction is theoretically difficult by deterministic prediction using a conventional weather forecasting model. A local rainfall such as the local downpour and the local total rainfall are particularly suitable as a weather phenomenon to be predicted by the database system of the present invention.

A computer program of the present invention is intended to cause a computer to function as the database system described above.

The computer program of the present invention can produce a functional effect similar to a functional effect of the database system of the present invention.

An air observation system of the present invention includes a plurality of Doppler LIDARs installed with a space from each other, and a calculation unit (wind-condition calculation unit) configured to generate wind-condition distribution information in an observation region based on an observation result made by the Doppler LIDARs.

The air observation system of the present invention can obtain highly-accurate information regarding wind condition by combining measurement results observed by the plurality of Doppler LIDARs. Also, the air observation system observes the wind condition by the Doppler LIDARs, which allows acquisition of weather elements regardless of weather during observation, fine, cloudy, or rain.

Furthermore, the air observation system of the present invention can be suitably used for acquiring the wind-condition distribution information used by the database system described above.

In the air observation system of the present invention, preferably, the wind-condition distribution information is at least wind-convergence pattern information, the calculation unit generates east-west wind-speed information and north-south wind-speed information based on the observation result of the plurality of Doppler LIDARs, and further generates the wind-convergence pattern information based on the east-west wind-speed information and the north-south wind-speed information.

This enables acquisition of highly-accurate wind-convergence pattern information.

In the air observation system of the present invention, the number of the installed Doppler LIDARs is preferably at least three.

By combining the measurement results observed by the three or more Doppler LIDARs, highly-accurate wind-condition distribution information with a smaller error can be acquired.

The weather forecasting system of the present invention is a weather forecasting system including the database system of the present invention and the air observation system of the present invention. The wind-condition distribution information in the prediction target region used by the database system is the wind-condition distribution information acquired by the air observation system.

The weather forecasting system of the present invention includes the database system of the present invention and the air observation system of the present invention, and thus can produce functional effects similar to functional effects of the database system and the air observation system described above. Therefore, even a local weather phenomenon can be predicted with high accuracy.

A weather information providing system of the present invention includes: the database system according to the present invention; and a reception terminal, wherein the database system further includes an output unit, the output unit sends the predicted weather information in the prediction target region and life information associated with the predicted weather information, and the reception terminal receives the predicted weather information and the life information which are sent from the output unit.

Also, the weather information providing system of the present invention preferably includes the air observation system of the present invention.

The weather information providing system of the present invention transmits the predicted weather information in the prediction target region and life information associated with the predicted judiciary information to the reception terminal. Accordingly, the user using the reception terminal can acquire the predicted weather information and the life information associated with the predicted weather information via the reception terminal. Therefore, the user can take safe and efficient measures based on these pieces of information.

Advantageous Effects of Invention

According to the present invention, even in the prediction target region where information for generating the predicted weather information increases with passage of time and conditions of the ground surface changes from moment to moment, information reflecting changed conditions of the ground surface is stored continuously, and thus weather in such a prediction target region can also be predicted.

DESCRIPTION OF EMBODIMENTS

Figure 1:
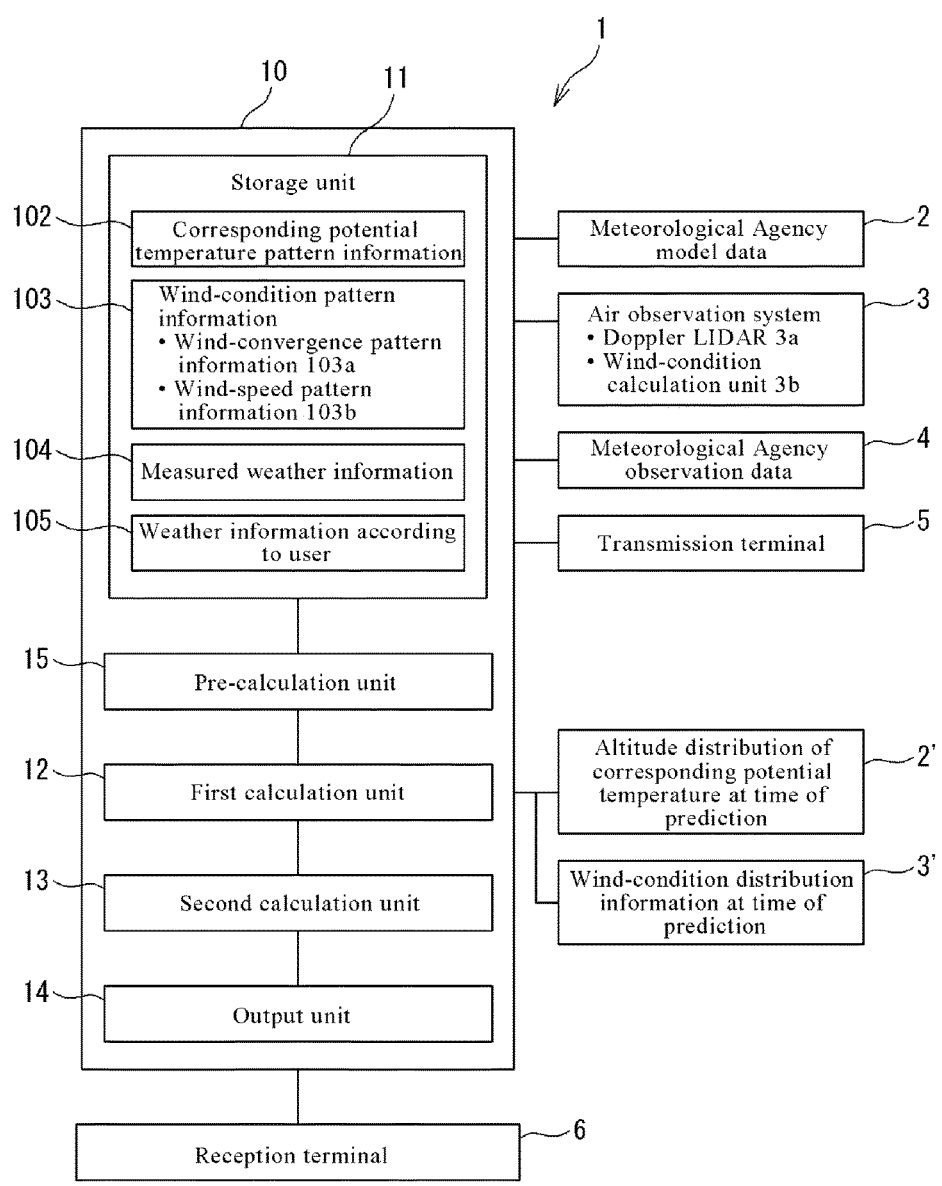
FIG. 1 is a schematic configuration diagram illustrating an embodiment of a weather information providing system including a database system according to the present invention.

Hereinafter, an embodiment of the present invention will be described with reference to the drawings.

A database system according to the embodiment of the present invention is a database system for predicting a weather phenomenon in a prediction target region, and includes a storage unit and a first calculation unit.

The storage unit stores wind-condition pattern information, corresponding potential temperature pattern information and measured weather information observed in the prediction target region.

The wind-condition pattern information is information created based on wind-condition distribution information that is in the prediction target region and that is obtained by an air observation system using Doppler LIDAR. The wind-condition pattern information and the measured weather information are associated with each other and stored in the storage unit.

The corresponding potential temperature pattern information is information created based on altitude distribution of corresponding potential temperature in the prediction target region. The corresponding potential temperature pattern information and the measured weather information are associated with each other and stored in the storage unit.

The first calculation unit compares wind-condition pattern information at the time of prediction with the wind-condition pattern information stored in the storage unit and extracts the wind-condition pattern information that is stored in the storage unit and that is relevant to the wind-condition pattern information at the time of prediction. The first calculation unit also compares corresponding potential temperature pattern information at the time of prediction with the corresponding potential temperature pattern information stored in the storage unit and extracts the corresponding potential temperature pattern information that is stored in the storage unit and that is relevant to the corresponding potential temperature pattern information at the time of prediction. Based on the measured weather information associated with the extracted wind-condition pattern information, and the measured weather information associated with the extracted corresponding potential temperature pattern information, the first calculation unit generates predicted weather information.

Therefore, by using the database system, even if such a region where the condition on the ground changes from moment to moment is the prediction target region, the weather in the region can be predicted with high accuracy.

In addition to the above-described database system, a weather information providing system according to the embodiment of the present invention further includes a reception terminal.

In the present invention, the wind-condition distribution information refers to information including a wind direction and wind speed at each prediction point and observation point in the prediction target region and an observation region.

Here, the embodiment of the present invention will be described in a case where wind-convergence pattern information and wind-speed pattern information are the above-described wind-condition pattern information, rainfall information is the above-described measured weather information, and predicted local rainfall information is the predicted weather information as an example.

Of course, the database system according to the embodiment of the present invention is not limited to such an example. For example, the corresponding potential temperature pattern information is arbitrary information.

FIG. 1 is a schematic configuration diagram illustrating the embodiment of the weather information providing system including the database system according to the present invention.

A weather information providing system 1 according to the embodiment of the present invention mainly includes a database system 10 and a reception terminal 6, as illustrated in FIG. 1.

The database system 10 mainly includes a storage unit 11, a first calculation unit 12, a second calculation unit 13, an output unit 14, and a pre-calculation unit 15.

As the database system 10, a computer including a CPU, a storage unit such as a RAM, a ROM, and a HDD, various input-output interfaces can be used. A computer program for causing the computer to function as the database system 10 is installed in this computer. Each of the aforementioned functions 11 to 14 included in the database system 10 is performed by the computer program being executed by the CPU.

First, information to be stored in the storage unit 11 of the database system 10 will be described.

Corresponding potential temperature pattern information 102, wind-condition pattern information 103 including wind-convergence pattern information 103$a$ and wind-speed pattern information 103$b$, measured weather information 104, and weather information 105 according to user are chronologically stored in the storage unit 11 at predetermined intervals which are set in advance, for example, every minute to every hour. Also. Each of the corresponding potential temperature pattern information 102 and the wind-condition pattern information 103 may be associated with the measured weather information 104 and stored, and may be further associated with the weather information 105 according to user and stored.

Although the weather information 105 according to user is arbitrarily stored information in the present exemplary embodiment, by storing the weather information 105 according to user together, prediction accuracy of the predicted weather information generated by the database system 10 can be improved.

The corresponding potential temperature pattern information 102 is information that serves as an index of stability of the air, and for example, is acquired by the following method and stored in the storage unit 11.

First, the pre-calculation unit 15 acquires, for example, altitude distribution of corresponding potential temperature in the prediction target region (for example, altitude 0 to 10 km) from Meteorological Agency model data 2 such as numerical forecast provided by the Meteorological Agency of Japan.

Here, the corresponding potential temperature will be described in full detail. Consider a process of gently raising an air parcel at a certain height to a height at which humidity becomes 100% (condenses), where all water vapor is changed into liquid water and removed. Condensation heat that occurs at that time is all provided to the air parcel. That is, a temperature of the air parcel rises. The temperature of the air parcel when the air parcel is gently lowered to the standard isobaric surface (usually 1000 hPa) is defined as the corresponding potential temperature (unit is Kelvin: K). Existence of warm, moist air means that the air is unstable, and whether the air is unstable can be determined with this corresponding potential temperature.

The Meteorological Agency model data 2 includes temperature, humidity, wind direction, and wind speed of an upper air measured by attaching an observation device to a balloon several times per day by the Meteorological Agency. The corresponding potential temperature is calculated by the next definitional equation using this measurement result.

$$\theta_e = T \exp\left(\frac{L w_s}{C_p T_d}\right)\left(\frac{p_0}{p}\right)^{\frac{R}{C_p}}$$ [Equation 1]

*T: Temperature of air parcel,
Td: Dew point temperature,
P0=1000 (hPa),
P: Air pressure at an altitude where the air parcel is present from the beginning,
Ws: Saturation mixing ratio when the air parcel is raised and reaches condensation level
L, Cp, R, Cp: Constant Next, the pre-calculation unit 15 increases resolution of altitude distribution of the corresponding potential temperature as necessary, and for example, acquires altitude distribution of the corresponding potential temperature with high resolution of about horizontal resolution of 50 m and vertical resolution of 100 m. At this time, the resolution of the altitude distribution of the corresponding potential temperature is not limited to the above-described resolution.

High resolution of the altitude distribution of the corresponding potential temperature may be achieved, for example, using the WRF (Weather Research and Forecasting) model or the like.

Next, the pre-calculation unit 15 performs fitting of the altitude distribution of the high-resolution corresponding potential temperature to a model indicating a relationship between the corresponding potential temperature and altitude by using the least squares method or the like, and defines a result thereof as the corresponding potential temperature pattern information 102.

Figure 2:
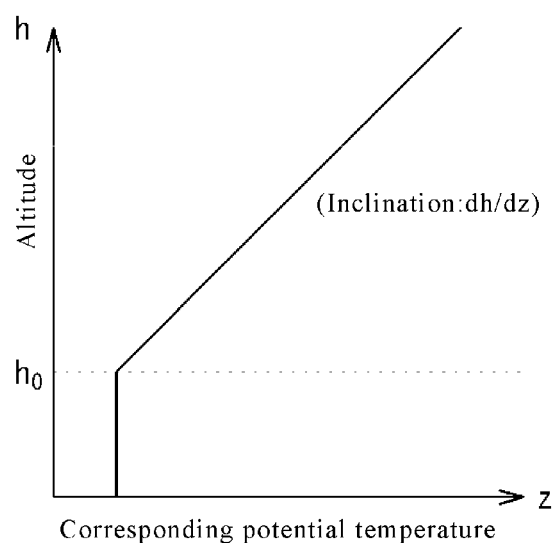
FIG. 2 is a model illustrating a relationship between corresponding potential temperature and altitude for acquiring corresponding potential temperature pattern information to be used in the present invention.
Figure 2:
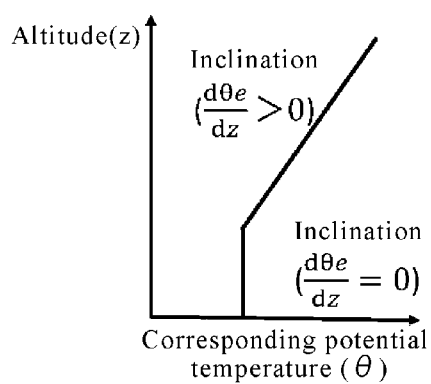
Figure 2:
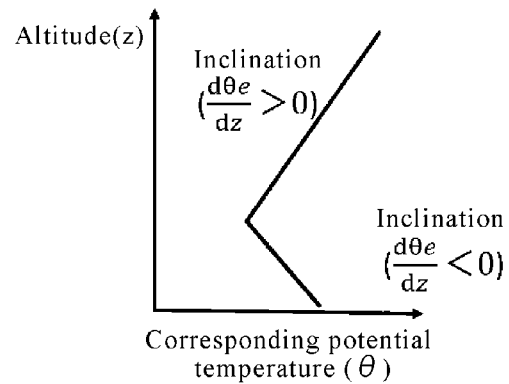

As a model indicating the relationship between the corresponding potential temperature and altitude, a model with altitude h on a vertical axis and corresponding potential temperature z on a horizontal axis as illustrated in FIG. 2 (A) can be used. In the model illustrated in FIG. 2 (A), thickness (altitude) $h_0$ of a convectively unstable layer that continues from the ground and inclination of corresponding potential temperature z (dh/dz) in an upper layer of the convectively unstable layer are plotted.

Accordingly, as the corresponding potential temperature pattern information 102, the thickness of the convectively unstable layer $h_0$ and the inclination of the corresponding potential temperature (dh/dz) will be stored as parameters.

The corresponding potential temperature pattern information 102 may be stored in the storage unit 11 every hour, for example.

Note that calculation for creating the corresponding potential temperature pattern information 102 (increasing resolution and fitting) does not need to be executed by the pre-calculation unit 15, and may be executed outside the database system 10.

Also, as illustrated in FIG. 2 (B) and FIG. 2 (C), as the model indicating the relationship between the corresponding potential temperature and altitude, dθe/dz may be used about altitude (z) and corresponding potential temperature (θe). According to this model, in a normal state where the air is stable, as illustrated in FIG. 2 (B), distribution (profile) of the corresponding potential temperature in a vertical direction has a shape with inclination of dθe/dz>0 or inclination of dθe/dz=0. Also, when warm, moist air enters a lower layer and the air is unstable, as illustrated in FIG. 2 (C), distribution (profile) of the corresponding potential temperature in the vertical direction in a layer where the air is unstable has a shape with inclination of dθe/dz<0.

The wind-condition pattern information 103 is information reflecting wind conditions (wind speed, wind direction, and the like) in the prediction target region. Information on air turbulence that indicates random behavior in a region near the ground will be reflected on this wind-condition pattern information 103.

Examples of the wind-condition pattern information 103 include the wind-convergence pattern information 103a and the wind-speed pattern information 103b. The pre-calculation unit 15 acquires these pieces of information and stores the information in the storage unit 11.

The wind-convergence pattern information 103a and the wind-speed pattern information 103b may be acquired by the database system 10, for example, based on the wind-condition distribution information calculated using an air observation system 3.

The wind-condition distribution information is a wind-speed image in an east-west direction (east-west wind-speed image) and a wind-speed image in a north-south direction (north-south wind-speed image). When the wind-condition pattern information 103 is created based on this information, for example, the pre-calculation unit 15 may execute the following calculation.

In this case, for the wind-speed pattern information 103b of the wind-condition pattern information 103, the east-west wind-speed image and the north-south wind-speed image can be used. The east-west wind-speed image and the north-south wind-speed image are information for displaying the east-west wind speed and north-south wind speed as images, and each pixel value of the images indicates a wind-speed value at a point corresponding to each pixel.

Accordingly, the wind-speed pattern information 103b in the present embodiment is information that uses the wind-speed value at each pixel as a parameter.

Also, in the present embodiment, the east-west wind-speed image and north-south wind-speed image themselves may be stored in the storage unit as the wind-speed pattern information 103b.

Also, the wind-convergence pattern information 103a of the wind-condition pattern information 103 may be created, for example, by execution of a process procedure illustrated in the following flowchart.

Figure 3:
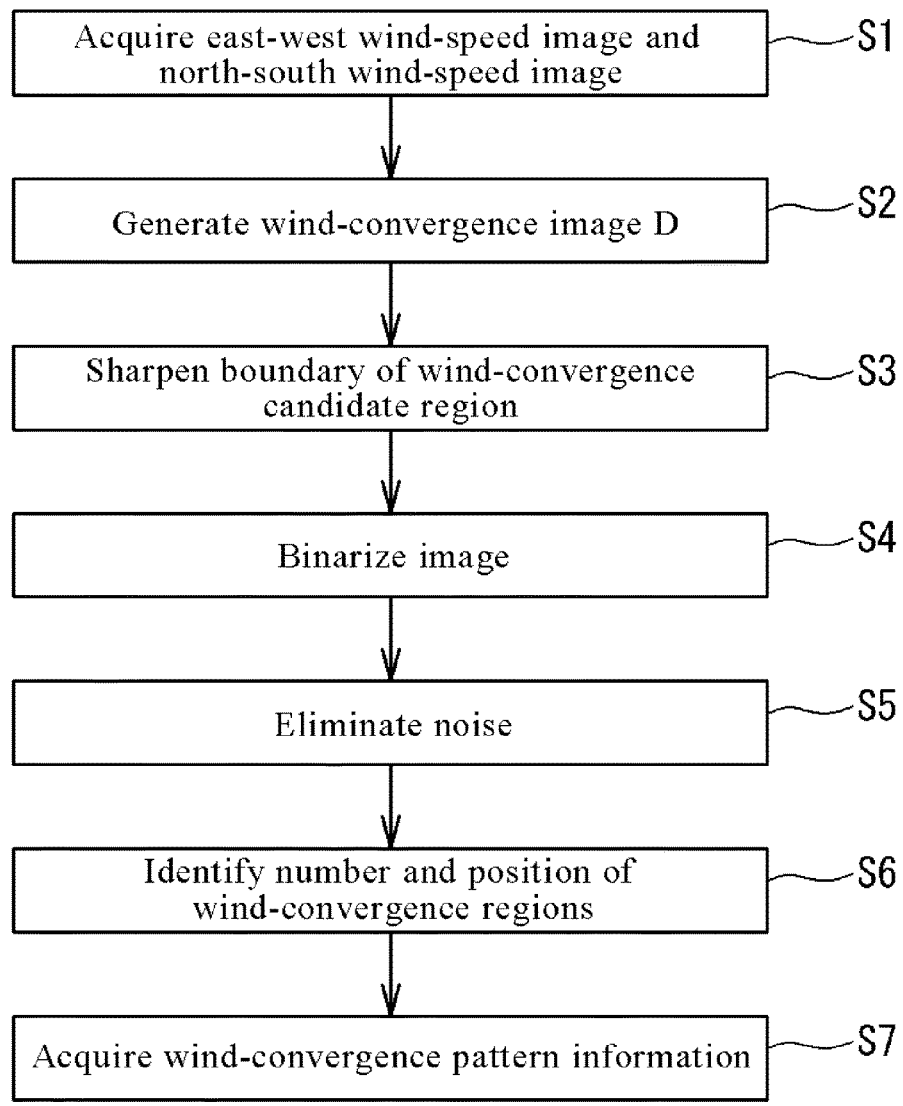
FIG. 3 is a flowchart illustrating a process procedure for creating wind-condition pattern information based on wind-condition distribution information obtained by an air observation system of the present invention.

FIG. 3 is a flowchart illustrating a process procedure for creating the wind-convergence pattern information 103a based on the wind-condition distribution information obtained by the air observation system 3 in the present invention.

Figure 4:
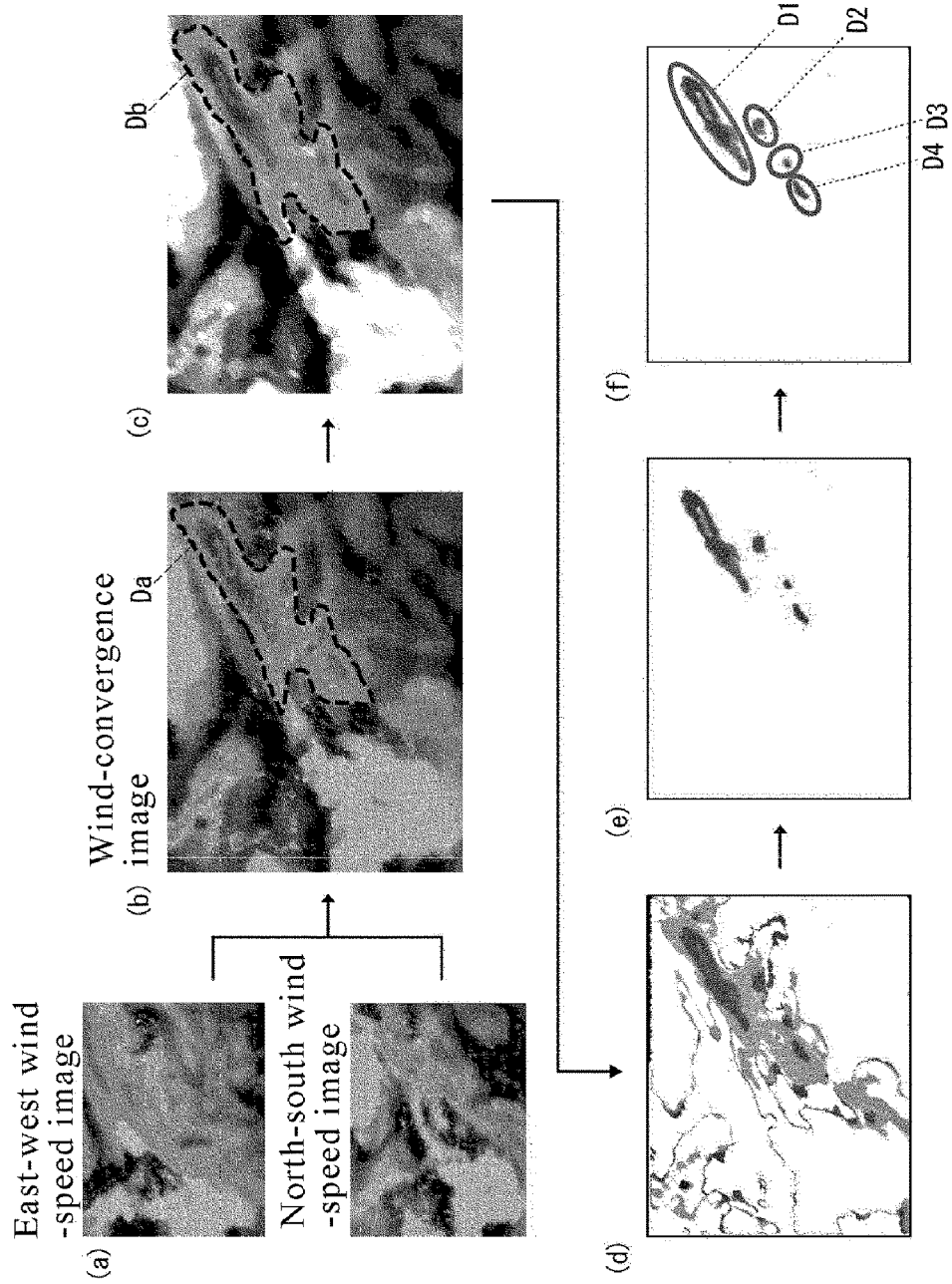
FIGS. 4 (a) to (f) are each a diagram illustrating one example of a process image at a time of creating the wind-condition pattern information based on the wind-condition distribution information obtained by the air observation system of the present invention.

FIGS. 4 (*a*) to (*f*) are each a diagram illustrating one example of a process image at a time of creating the wind-convergence pattern information 103*a* based on the wind-condition distribution information obtained by the air observation system 3 in the present invention. Note that FIGS. 4 (*b*) and (*c*) are process images displayed in color.

First, the wind-speed image of the east-west direction and the wind-speed image of the north-south direction are input into the pre-calculation unit 15 (step S1 of FIG. 3, FIG. 4 (*a*)).

Next, the pre-calculation unit 15 combines a wind-speed (u) image of the east-west (x) direction and a wind-speed (v) image of the north-south (y) direction to generate a wind-convergence image D (step S2 of FIG. 3, FIG. 4 (*b*)). The convergence image D is an image in which each pixel D (x, y) indicates a convergence value. The convergence value is a value indicating a degree to which wind is convergent.

Here, the wind-convergence value D (x, y) at each pixel can be calculated by the following equation (1).

[Equation 2]

$$D(x, y) = \frac{du(x, y)}{dx} + \frac{dv(x, y)}{dy} \quad (1)$$

Note that in the image illustrated in FIG. 4 (*b*), a section surrounded with a dashed line is a candidate region Da of a section in which wind is convergent (wind-convergence candidate region), and the dashed line is added supplementarily to facilitate understanding of the candidate region Da.

Next, the pre-calculation unit 15 performs a sharpening process of the wind-convergence image generated in step S2 described above. The wind-convergence candidate region Da is sharpened by the sharpening process (step S3 of FIG. 3, FIG. 4 (*c*)). Note that in the image illustrated in FIG. 4 (*c*), the dashed line is a line added supplementarily to facilitate understanding of a boundary of a sharpened wind-convergence candidate region Db.

Here, as a method for sharpening the boundary of the wind-convergence candidate region Da, a conventionally known method can be used.

For example, an image with the sharpened boundary of the wind-convergence candidate region Da can be acquired by applying a Laplacian filter process to the wind-convergence image generated in step S2 described above to derive a Laplacian filter image (Im), and performing a process for subtracting kIm from the wind-convergence image generated in S2. Here, k is a coefficient derived from an experience side.

Also, as another method for sharpening the boundary of the wind-convergence candidate region, for example, an image with the sharpened boundary of the wind-convergence candidate region can be acquired by multiplying a filter function H to perform inverse Fourier transform after performing two-dimensional Fourier transform on the wind-convergence image generated in step S2 described above. Here, as the filter function H, the following equation (2) can be applied.

$$H = 1 + IHhp \quad (2)$$

(in the equation, Hhp is a high-pass filter function, and I is a coefficient derived from an experience side)

Next, the pre-calculation unit 15 applies a binarization process to the image of the sharpened wind-convergence candidate region Db (step S4 of FIG. 3, FIG. 4 (*d*)). The wind-convergence region can be extracted by this binarization process.

As a method for the binarization process, a conventionally known method can be used, and for example, the P-Tile method, 3σ (sigma) method, discriminant analysis method, mode method, and the like can be used.

Next, the pre-calculation unit 15 eliminates noise from the binarized wind-convergence image (step S5 of FIG. 3, FIG. 4 (*e*)).

Here, as a method for eliminating noise, a conventionally known method can be used, and for example, expansion and contraction processes can be used. In the expansion and contraction processes, the expansion process of replacing a pixel in contact with a pixel of 1 to 1 and the contraction process of replacing a pixel in contact with a pixel of 0 to 0 are each performed repeatedly about two to three times.

Next, the pre-calculation unit 15 identifies the number of convergence regions based on the wind-convergence image from which noise is eliminated, and identifies regions D1, D2, D3, and D4 of each convergence region (in FIG. 4 (*f*)) (step S6 of FIG. 3, FIG. 4 (*f*)).

Here, a method for identifying the convergence region is not particularly limited, and for example, identification of the convergence region may be performed using a conventionally known labeling process or the like. The labeling process can be performed, for example, by a method using raster scan or the like.

Next, the pre-calculation unit 15 acquires the wind-convergence pattern information 103*a* based on the convergence region identified in step S6 described above (step S7 of FIG. 3).

From the convergence region identified in step S6 described above, the wind-convergence pattern information 103*a* prescribed with various parameters can be acquired.

As the parameters, for example, information regarding a shape of the convergence region, such as strength of the convergence region, center-of-gravity position of the convergence region, area of the convergence region, roundness of the convergence region, and principal-axis angle of the convergence region, and information regarding distribution of the convergence region inside the image region such as a position of the maximum value of the convergence region in the wind-convergence image, information on distribution of the convergence region, weighted center of gravity by the convergence value and the like can be acquired.

Accordingly, the wind-convergence pattern information 103*a* is information using the information regarding the shape of the convergence region and the information regarding distribution of the convergence region as the parameters.

Through such a process procedure, the wind-convergence pattern information 103*a* can be created based on the east-west wind-speed image and the north-south wind-speed image obtained by the air observation system 3. The created wind-convergence pattern information 103*a* is stored in the storage unit 11 as described above.

Also, the present embodiment may cause the storage unit 11 to store the images themselves acquired in the process of executing step S1 to step S7 described above, such as the sharpened wind-convergence image (step S3) and the wind-convergence image from which noise is eliminated (step S5) as the wind-convergence pattern information.

Also, when the pre-calculation unit 15 acquires information regarding the distribution of the convergence region out of the parameters regarding the wind-convergence pattern information through the process procedure illustrated in FIG. 3, after sharpening the boundary of the wind-convergence region in the wind-convergence image in step S3 described above, the pre-calculation unit 15 may acquire the information regarding the distribution of the convergence region directly from the wind-convergence image in which the boundary of the wind-convergence region is sharpened without executing steps S4 to S6 described above.

Also, about the wind-convergence image acquired by the above-described process procedure (step S6), by using the wind-convergence image acquired at different time ($t_n$, $t_{n+1}$) in an identical image region, the pre-calculation unit 15 may calculate changes in a movement direction and movement speed regarding movement of the convergence region that occurs from time $t_n$ to time $t_{n+1}$, strength of the convergence region, and a shape of the convergence region (center-of-gravity position, area, roundness, principal-axis angle, and the like) by the background difference method, and these pieces of information may be used as the parameters of the wind-convergence pattern information 103a.

Note that the wind-convergence pattern information 103a does not necessarily need to be created by the pre-calculation unit 15. For example, the wind-condition pattern information may be created outside based on the wind-condition distribution information, and the information may be stored in the storage unit 11. Specifically, for example, the wind-condition calculation unit 3b included in the air observation system 3 may create the wind-convergence pattern information 103a.

The measured weather information 104 is information regarding a weather phenomenon actually observed inside the prediction target region, or an analyzed value obtained by objective analysis based on the information, or both of these pieces of information. For rainfall information, for example, Meteorological Agency observation data 4 observed (and further analyzed as needed) with an existing X-band weather radar, C-band weather radar, and the like will be stored in the storage unit 11 as the measured weather information 104. As an observation method of the rainfall information described above, the X-band weather radar is preferable in terms of high horizontal resolution.

The measured weather information 104 may be stored in the storage unit 11 every minute, for example.

Also, the rainfall information can be observed with a rain gauge.

Also, in addition to the rainfall information, for example, information such as temperature and humidity may be observed as the measured weather information 104 and stored in the storage unit 11 together.

Moreover, a characteristic weather phenomenon that occurs inside and outside the prediction target region, for example, a weather phenomenon such as typhoon and tornado may be stored together in the storage unit 11.

The weather information 105 according to user is information regarding a weather phenomenon the user actually experiences in the prediction target region. For example, when the weather information 105 according to user is rainfall information, information on whether it is actually raining is transmitted from a transmission terminal 5 to the database system 10 together with positional information of the user, and is stored in the storage unit 11.

As already described, the corresponding potential temperature pattern information 102 and the wind-condition pattern information 103 are each associated with the measured weather information 104 and stored in the storage unit 11. For example, the corresponding potential temperature pattern information 102 and the wind-condition pattern information 103, and at an observation point identical to the observation point thereof, the measured weather information 104 that indicates the weather that actually occurs due to the corresponding potential temperature and wind condition indicated by the pattern information 102,103 are associated with each other and stored. In this case, the pieces of information will be associated with each other and stored with the observation point as an index.

Note that the index to be used for association and storage is not limited to the observation point, and date and time, temperature and humidity, and other information may be used together as an index for association and storage.

Also, as will be described later, when a predicted weather phenomenon is generated using a Bayesian network, the corresponding potential temperature pattern information 102, the wind-condition pattern information 103, and the measured weather information 104 may constitute nodes inside the identical Bayesian network to associate these pieces of information with each other.

Thus, in the present embodiment, the corresponding potential temperature pattern information 102, the wind-condition pattern information 103, the measured weather information 104, and the weather information 105 according to user are stored in the storage unit 11 of the database system 10 with passage of time, and information that serves as materials for determination for generating the predicted weather information in the prediction target region is strengthened with passage of time.

In the present embodiment, while horizontal resolution of various pieces of data stored in the storage unit 11 of the database system 10 is not particularly limited, horizontal resolution of the corresponding potential temperature pattern information 102 and the wind-condition pattern information 103 is preferably about 50 to 100 mm. This is because, for example, a weather phenomenon in a local region such as a region of one road in an urban area can be predicted by predicting a weather phenomenon using such information on horizontal resolution.

Also, the storage unit 11 of the database system 10 stores not only the above-described information but also the predicted weather information generated by the first calculation unit 12 to be described later and prediction accuracy information generated by the second calculation unit 13.

Also, in the database system 10, when the storage unit 11 stores various pieces of information described above, the various pieces of information may be stored as it is in stored order, and may be stored as grouped information based on a predetermined index. For example, information that is grouped for every specified month or every specified 30 days may be stored with month or arbitrary 30 days as an index, and information that is grouped for every specified season may be stored with season as an index. Of course, both the original information and the grouped information may be stored.

Next, a method for generating the predicted weather information will be described.

Figure 5A:
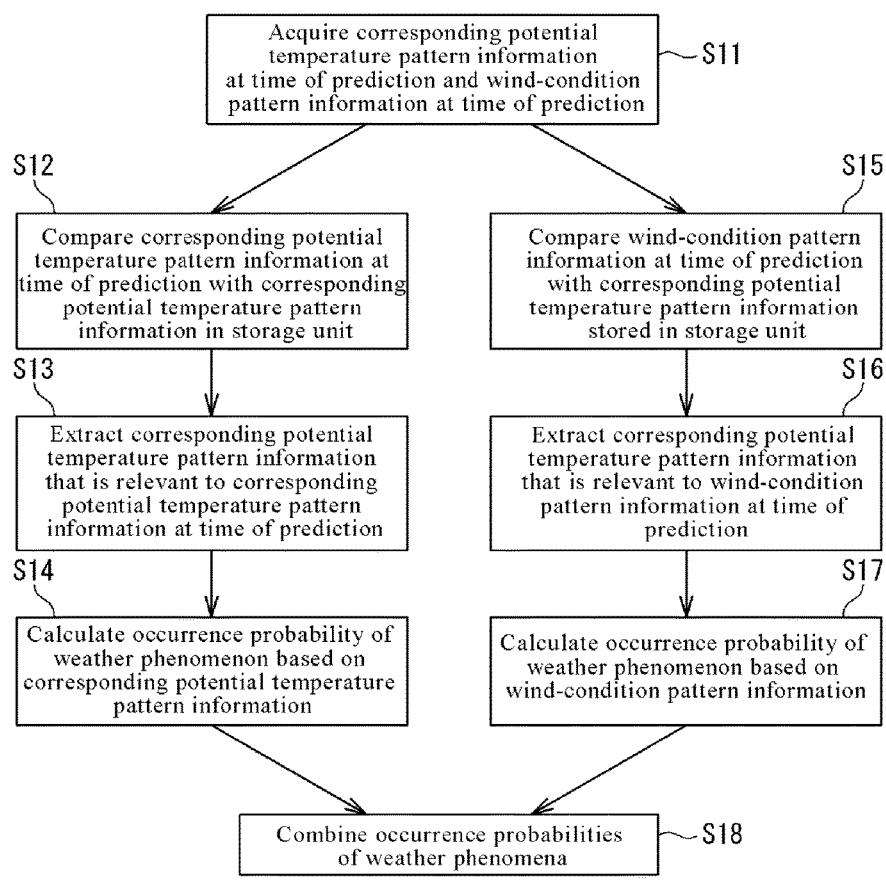
FIG. 5A is a flowchart illustrating one example of a treatment procedure for generating predicted weather information in the present invention.

FIG. 5A is a flowchart illustrating one example of a treatment procedure for generating the predicted weather information in the present invention.

Generation of the predicted weather information is performed by the first calculation unit 12.

First, the first calculation unit 12 acquires the corresponding potential temperature pattern information based on altitude distribution of the corresponding potential temperature at the time of prediction 2' (corresponding potential temperature pattern information at the time of prediction) and the wind-condition pattern information based on wind-condition distribution information 3' (wind-condition pattern information at the time of prediction) (FIG. 5A, step S11).

An acquisition method of the corresponding potential temperature pattern information at the time of prediction and the wind-condition pattern information at the time of prediction is also similar to an already described acquisition method of the corresponding potential temperature pattern information 102 and the wind-condition pattern information 103 to be stored in the storage unit 11.

Next, the first calculation unit 12 compares the corresponding potential temperature pattern information at the time of prediction with the corresponding potential temperature pattern information 102 stored in the storage unit 11 (FIG. 5A, step S12). Then, the first calculation unit 12 extracts the corresponding potential temperature pattern information 102 that is relevant to the corresponding potential temperature pattern information at the time of prediction out of the corresponding potential temperature pattern information 102 stored in the storage unit 11 (FIG. 5A, step S13).

At this time, a comparison may be made between the corresponding potential temperature pattern information at the time of prediction and the already stored corresponding potential temperature pattern information 102 at each observation point (prediction point) obtained by dividing the prediction target region by the above-described horizontal resolution.

Also, presence of relevance between the corresponding potential temperature pattern information at the time of prediction and the already stored corresponding potential temperature pattern information 102 may be performed based on presence of predetermined correlation determined in advance. For example, attention is paid to the thickness $h_0$ of the convectively unstable layer and the inclination of the corresponding potential temperature (dh/dz), which are examples of parameters of the corresponding potential temperature pattern information 102. Information with a difference between each of the thickness $h_0$ of the convectively unstable layer and the inclination of the corresponding potential temperature (dh/dz) of the corresponding potential temperature pattern information at the time of prediction, and the parameter thereof being for example within ±10% can be defined as the corresponding potential temperature pattern information with correlation (with relevance).

Subsequently, the first calculation unit 12 predicts a weather phenomenon at each prediction point based on the extracted corresponding potential temperature pattern information 102 (FIG. 5A, step S14).

Here, since the actually observed measured weather information is associated with each piece of the extracted corresponding potential temperature pattern information 102, when the corresponding potential temperature pattern information that has correlation with the corresponding potential temperature pattern information at the time of prediction is observed, whether rain is actually observed and how much rainfall is observed can be understood. Accordingly, the first calculation unit 12 can predict the weather phenomenon at each prediction point based on the corresponding potential temperature pattern information at the time of prediction, for example, as occurrence probability of the weather phenomenon such as a probability of rain and a probability of rain with a rainfall equal to or greater than a predetermined rainfall.

Also, the first calculation unit 12 compares the wind-condition pattern information at the time of prediction with the wind-condition pattern information 103 stored in the storage unit 11 (FIG. 5A, step S15). Then, the first calculation unit 12 extracts the wind-condition pattern information 103 that is relevant to the wind-condition pattern information at the time of prediction out of the wind-condition pattern information 103 stored in the storage unit 11 (FIG. 5A, step S16).

At this time, comparison may be made between the wind-condition pattern information at the time of prediction and the already stored wind-condition pattern information 103 at each observation point (prediction point) obtained by dividing the prediction target region by the above-described horizontal resolution.

Also, presence of relevance between the wind-condition pattern information at the time of prediction and the already stored wind-condition pattern information 103 may be performed based on presence of predetermined correlation determined in advance. For example, in the wind-convergence pattern information 103a, which is one of the wind-condition pattern information 103, attention is paid to the parameters, such as strength of the convergence region, center-of-gravity position of the convergence region, area of the convergence region, roundness of the convergence region, principal-axis angle of the convergence region, position of the maximum value of the convergence region, distribution information of the convergence region, and weighted center of gravity by the convergence value. When compared with each parameter of the wind-condition pattern information at the time of prediction, information having the parameter with a correlation coefficient value of, for example, 0.8 or more can be defined as the wind-condition pattern information with correlation (with relevance). Note that there is strong correlation when this correlation value is 0.7 or more, and preferably the correlation value is 0.8 or more.

This correlation coefficient can be calculated by the next equation using the above-described parameters.

$$\frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{[Equation 3]}$$

$^*i = 1, 2, \ldots, n$ $\bar{x}$ and $\bar{y}$ each denote an arithmetic mean.

As weighting at the time of determining this correlation, weighting to each of LIDAR observation data, quantitative information, and qualitative information is preferably performed as follows. Weighting of 0.8 or more can be performed to LIDAR observation data obtained by Doppler LIDAR (the number of convergence regions, convergence line length, average convergence value, and the like), and preferably weighting of 0.9 or more is performed.

Also, weighting of 0.7 or more can be performed to quantitative information obtained from the Meteorological Agency observation data by numerical calculation (convectively unstable layer thickness, average vertical gradient of corresponding potential temperature, and the like), and preferably weighting of 0.8 or more is performed.

Also, weighting of 0.7 or less can be performed to qualitative information obtained by word-of-mouth communication or the like, and preferably weighting of 0.6 or less is performed. Also, initial weighting to this qualitative information can be 0.3 or less, is preferably 0.2 or less, and is more preferably 0.1 or less. Thus, output of inadequate forecast can be prevented in early stages by reducing the weighting to initial qualitative information.

Subsequently, the first calculation unit 12 predicts the weather phenomenon at each prediction point based on the extracted wind-condition pattern information 102 (FIG. 5A, step S17).

Here, since the actually observed measured weather information is associated with each piece of the extracted wind-condition pattern information 103, when the wind-condition pattern information that has correlation with the wind-condition pattern information at the time of prediction is observed, whether rain is actually observed and how much rainfall is observed can be understood. Accordingly, the first calculation unit 12 can predict the weather phenomenon at each prediction point based on the wind-condition pattern information at the time of prediction, for example, as occurrence probability of the weather phenomenon such as a probability of rain and a probability of rain with a rainfall equal to or greater than a predetermined rainfall.

Then, by combining the occurrence probability of the weather phenomenon acquired from the corresponding potential temperature pattern information at the time of prediction and the occurrence probability of the weather phenomenon acquired from the wind-condition pattern information at the time of prediction, the first calculation unit 12 predicts the weather phenomenon at each prediction point and generates the weather forecast information in the prediction target region, for example, by multiplying both of the occurrence probabilities (FIG. 5A, step S18).

Also, in the database system 10, the corresponding potential temperature pattern information 102 and the wind-condition pattern information 103 may be associated with the weather information 105 according to user. In this case, after extracting the corresponding potential temperature pattern information 102 and the wind-condition pattern information 103 that have correlation, the first calculation unit 12 may generate the predicted weather information in consideration of the user weather information together with the measured weather information.

Note that although an example has been described here in which the predicted weather information is generated using the corresponding potential temperature pattern information at the time of prediction and the wind-condition pattern information at the time of prediction, the database system according to the embodiment of the present invention may generate the predicted weather information by using only the wind-condition pattern information at the time of prediction.

Also, the database system 10 includes the second calculation unit 13.

The second calculation unit 13 compares the predicted weather information generated by the first calculation unit 12 with the weather phenomenon that actually occurs, generates the prediction accuracy information, and stores the generated prediction accuracy information in the storage unit 11. That is, the second calculation unit 13 stores information on whether prediction of the weather phenomenon performed at each prediction point in the prediction target region proves true in the storage unit 11. The prediction accuracy information is calculated, for example, based on statistics of whether prediction of weather phenomena proves true.

Also, when prospected accuracy information is stored in the storage unit 11, for example, in a case where the first calculation unit 12 newly extracts the corresponding potential temperature pattern information 102 and the wind-condition pattern information 103 that have correlation with the corresponding potential temperature pattern information at the time of prediction and the wind-condition pattern information at the time of prediction in order to generate the predicted weather information, when the extracted pattern information is pattern information with low prediction accuracy (for example, pattern information with low accuracy rate in calculated statistics), even if the pattern information is extracted as pattern information with correlation, the first calculation unit 12 eliminates the pattern information from pattern information for generating the predicted weather information.

Thus, further improvement in the prediction accuracy can be achieved by generating the predicted weather information without using the corresponding potential temperature pattern information 102 and the wind-condition pattern information 103 with low prediction accuracy. Also, reliability can be imparted to each piece of the pattern information according to statistics of the prediction accuracy information, and subsequent weather phenomenon can also be predicted in consideration of this reliability.

Also, in the database system 10, the first calculation unit 12 compares the corresponding potential temperature pattern information at the time of prediction and the wind-condition pattern information at the time of prediction with the pattern information stored in the storage unit 11. Then, the first calculation unit 12 extracts the corresponding potential temperature pattern information 102 and the wind-condition pattern information 103 that are relevant to the pattern information at the time of prediction out of the corresponding potential temperature pattern information 102 and the wind-condition pattern information 103 stored in the storage unit 11. Based on the measured weather information associated with the extracted corresponding potential temperature pattern information 102 and the wind-condition pattern information 103, the following method can also be used as a method for generating the predicted weather information.

That is, when extracting the corresponding potential temperature pattern information 102 and the wind-condition pattern information 103 which are relevant to the pattern information at the time of prediction, the first calculation unit 12 can also use a method using specified prediction target weather as an index of relevance.

Here, a case where the prediction target weather is whether it rains with rainfall equal to or greater than a predetermined amount (local downpour) will be described.

First, the first calculation unit 12 selects the measured weather information in which rainfall equal to or greater than the predetermined amount is observed out of the measured weather information 104 stored in the storage unit 11. Then, the first calculation unit 12 extracts the corresponding potential temperature pattern information 102 and the wind-condition pattern information 103 associated with the measured weather information.

Next, the first calculation unit 12 compares each piece of the extracted corresponding potential temperature pattern information 102 with the corresponding potential temperature pattern information at the time of prediction to determine presence of correlation with the corresponding potential temperature pattern information at the time of prediction. Note that the determination of presence of correlation may be made by the above-described method, for example.

Then, the first calculation unit 12 calculates the occurrence probability of rainfall equal to or greater than the predetermined amount based on the corresponding potential temperature pattern information by using a ratio of existence of the corresponding potential temperature pattern information that has correlation with the corresponding potential temperature pattern information at the time of prediction to the corresponding potential temperature pattern information that does not have correlation with the corresponding potential temperature pattern information at the time of prediction.

Also, the first calculation unit 12 also compares each piece of the extracted wind-condition pattern information 103 with the wind-condition pattern information at the time of prediction to determine presence of correlation with the wind-condition pattern information at the time of prediction. Here, the determination of presence of correlation may also be made by the above-described method, for example.

Then, the first calculation unit 12 calculates the occurrence probability of rainfall equal to or greater than the predetermined amount based on the wind-condition pattern information by using a ratio of existence of the wind-condition pattern information that has correlation with the wind-condition pattern information at the time of prediction to the wind-condition pattern information that does not have correlation with the wind-condition pattern information at the time of prediction.

Then, by multiplying the occurrence probability of rainfall equal to or greater than the predetermined amount acquired from the corresponding potential temperature pattern information at the time of prediction by the occurrence probability of rainfall equal to or greater than the predetermined amount acquired from the wind-condition pattern information at the time of prediction, the first calculation unit 12 predicts possibility that it will rain with rainfall equal to or greater than the predetermined amount at each prediction point and generates the weather forecast information in the prediction target region.

In the database system 10, since the corresponding potential temperature pattern information 102 and the wind-condition pattern information 103 are associated with the measured weather information, the first calculation unit 12 can also generate the prospected weather information by such a method.

Furthermore, in the database system 10 according to the embodiment of the present invention, the method by which the first calculation unit 12 generates the predicted weather information is not limited to the above-described method; for example, the first calculation unit 12 may calculate probability that a specified weather phenomenon will occur at each prediction point by a method using the Bayesian network based on information stored in the storage unit 11, and may generate the predicted weather information in the prediction target region based on a result of the calculation.

In this case, the storage unit 11 stores the Bayesian network including at least the corresponding potential temperature pattern information, the wind-condition pattern information (wind-convergence pattern information and wind-speed pattern information), each node using the measured weather information and the prediction target weather phenomenon observed in the prediction target region as random variables, priori probability or posteriori probability regarding the random variable of each node, and links between the nodes. The first calculation unit 12 generates the predicted weather information based on the corresponding potential temperature pattern information at the time of prediction, the wind-condition pattern information at the time of prediction, and the posteriori probability extracted from a conditional probability table held at the node using the prediction target weather phenomenon as the random variable.

This will be described below.

The present embodiment that predicts the probability that a specified weather phenomenon will occur by the method using the Bayesian network and generates the predicted weather information constructs the Bayesian network first.

Figure 5B:
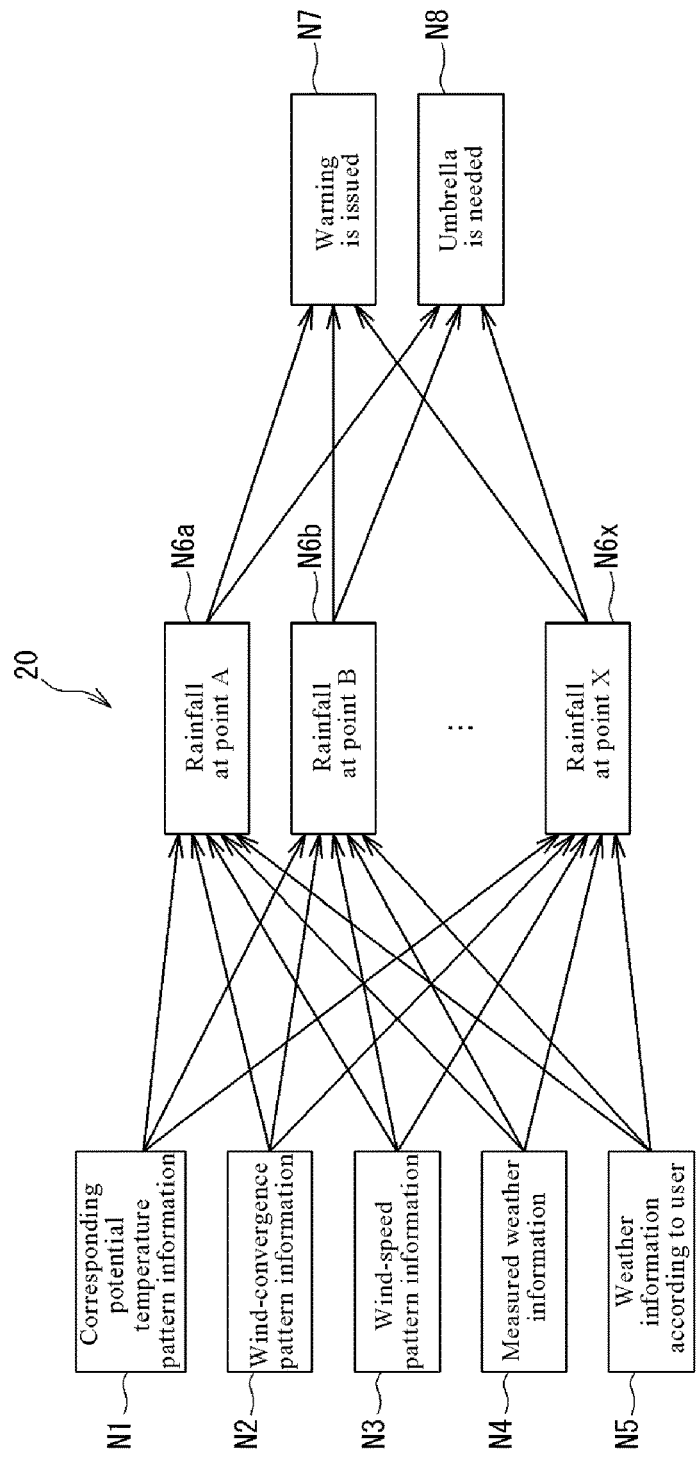
FIG. 5B is a diagram schematically illustrating one example of a Bayesian network used in the present invention.

FIG. 5B is a diagram schematically illustrating one example of the Bayesian network used in the present invention.

The Bayesian network is a probabilistic model that represents qualitative dependence between the plurality of random variables according to graph structure and represents a quantitative relationship between individual variables with conditional probability, and includes the random variables, graph structure representing dependence therebetween, and a set of conditional probabilities.

In the Bayesian network 20 illustrated in FIG. 5B, the Bayesian network is constructed of the corresponding potential temperature pattern information, the wind-convergence pattern information, the wind-speed pattern information, the measured weather information, and the weather information according to user as nodes N1 to N5, respectively, rainfall at prediction points (point A to point X) in the prediction target region with these nodes N1 to N5 as parent nodes as nodes N6a to N6x, respectively, and "warning is issued" and "umbrella is needed" as nodes N7, N8 with these nodes N6a to N6x as parent nodes, which are stored in the storage unit 11.

Each node N1 to N8 that constitutes the Bayesian network 20 holds a priori probability table or conditional probability table (CPT) according to a state each node can have. This probability table is updated every time the state of the node increases (for example, every time an observation result is stored).

In the Bayesian network 20, a node from which an arrow (link) starts and ends at each of the nodes N1 to N5 does not exist, that is, parent nodes of the nodes N1 to N5 do not exist. Accordingly, the nodes N1 to N5 each hold a probability (priori probability) for the state each node can have as the priori probability table for each state.

Here, the state each node can have is an element to be properly selected for each node. For example, in the node N1 of the corresponding potential temperature pattern information, pattern meter or the like that represents the corresponding potential temperature pattern information which are parameters of the corresponding potential temperature pattern information, such as the thickness $h_0$ of the convectively unstable layer and the inclination of the corresponding potential temperature (dh/dz) will be the state the node N1 can have. Also, for example, in the node N2 of the wind-convergence pattern information, the above-described parameters of the wind-convergence pattern information, such as strength of the convergence region, center-of-gravity position of the convergence region, area of the convergence region, roundness of the convergence region, principal-axis angle of the convergence region, position of the maximum value of the convergence region, distribution information of the convergence region, weighted center of gravity by the convergence value and the like will be the state the node N2 can have. In the node N3 of the wind-speed pattern information, the parameters of the wind-speed pattern information, such as wind speed and wind direction, will be the state the node N3 can have.

Furthermore, for example, in the node N4 of the measured weather information, actual weather such as fine, rain, and cloudy weather, rainfall, temperature, humidity, and the like will be the state the node N4 can have. In the node N5 of the weather information according to user, weather information provided by a user, such as fine, rain, and cloudy weather, information based on bodily sensation of the user, such as hot, cold, and humid, and the like will be the state the node N5 can have.

Of course, the state the nodes N1 to N5 can have is not limited to these states. Also, each state may be divided into a numeric range as necessary.

Since each of the nodes N6a to N6x with rainfall at point A to rainfall at point X as the random variable has parent nodes N1 to N5, each of the nodes N6a to N6x holds occurrence probability (posteriori probability) of the state a self-node (nodes N6a to N6x) can have when a state of the parent node occurs as the conditional probability table (CPT) for each state of the parent node.

The nodes N6a to N6x can have, for example, a state of rainfall (for example, at one-ml intervals) after a certain period of time (for example, at one-hour intervals).

Also, each of the node N7 with "warning is issued" as the random variable and the node N7 with "umbrella is needed" as the random variable holds occurrence probability (posteriori probability) of the state self-node (N7, N8) can have when a state of the parent nodes (N6a to N6x) occurs as the conditional probability table (CPT) for each state of the parent nodes.

The conditional probability table each node holds will be described some more.

Figure 5C:
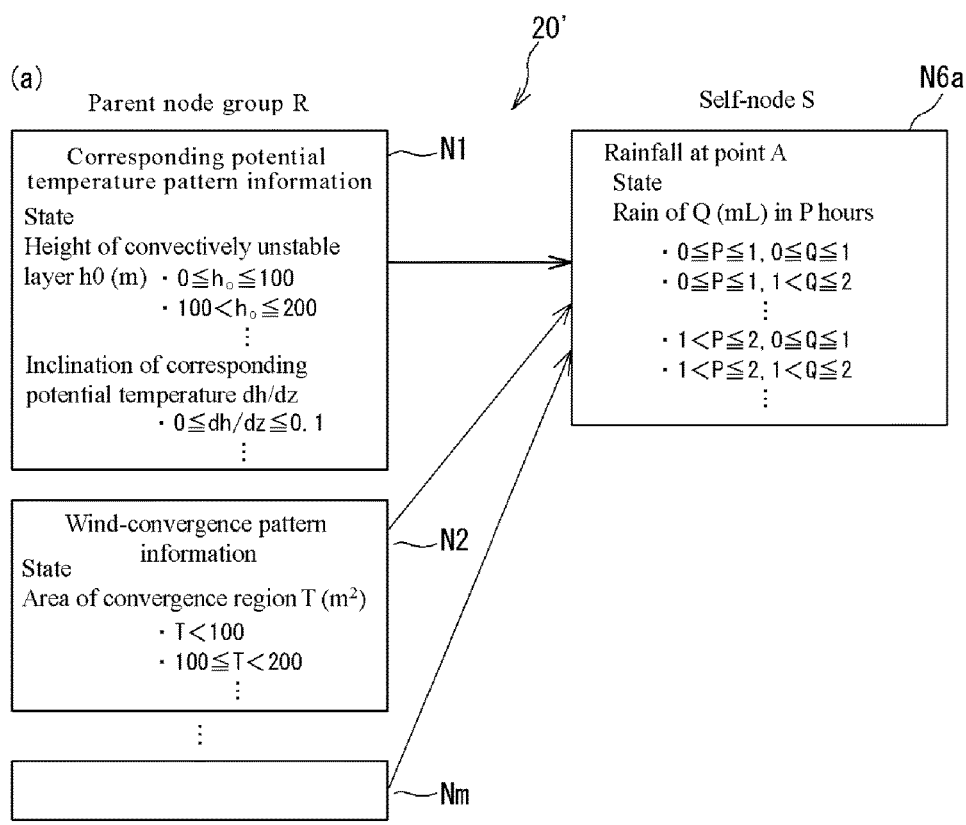
FIG. 5C (a) is a diagram schematically illustrating part of the Bayesian network, whereas (b) is a diagram for describing a conditional probability table held by a child node that constitutes the Bayesian network illustrated in (a).

FIG. 5C (a) is a diagram schematically illustrating part of the Bayesian network, whereas (b) is a diagram for describing the conditional probability table held by a child node that constitutes the Bayesian network illustrated in (a).

Here, as illustrated in (a) of FIG. 5C, a description will be provided of an example of the conditional probability table (refer to (b) of FIG. 5C) held by the node N6a (self-node S) of the rainfall at point A that has m nodes including the node N1 of the corresponding potential temperature pattern information and the node N2 of the wind-convergence pattern information as a parent node group R.

In this example, in a Bayesian network 20' illustrated in (a), the node N1 of the corresponding potential temperature pattern information has a plurality of ($N_{R1}$) states, such as per height of the convectively unstable layer $h_0$, 0 m or more and 100 m or less, exceeding 100 m and 200 m or less, per inclination of the corresponding potential temperature dh/dz, 0 or more and 0.1 or less. The node N2 of the wind-convergence pattern information also has a plurality of ($N_{R2}$) states, such as less than 100 m$^2$ per area of the convergence region. Each of the other nodes (N3 to Nm) included in the parent node group also has one or more ($N_{R3}$ to $N_{Rm}$) states. Accordingly, a total number $N_{totalR}$ of combination of the state the parent node group R can have is $N_{R1} \times N_{R2} \times N_{R3} \ldots N_{Rm}$.

Meanwhile, the node N6a (self-node S) of the rainfall at point A has, regarding "rain of Q mL will fall in P hours", a plurality of ($S_{Ns}$) states such as rain of 0 to 1 mL will fall in 0 to 1 hour, rain of exceeding 1 mL and 2 mL or less will fall in 0 to 1 hour.

In such an example, as illustrated in (b) of FIG. 5C, a conditional probability table 21 held by the node N6a is represented by a matrix with $S_{Ns}$ rows and $N_{R1} \times N_{R2} \times N_{R3} \ldots N_{Rm}$ (=$N_{totalR}$) columns.

Also, in this conditional probability table 21, conditional probability P of the self-node S on condition of the state of the parent node group R ($S=s_i|R=r_j$) is introduced into each matrix element. Specifically, for example, probability "rain of 4 to 5 mL will fall in 0 to 1 hour when height of the convection zone is 100 to 200 m, area of the convergence region is 300 to 400 m$^2$, and so on" is introduced into a matrix element A as posteriori probability (conditional probability).

In the present embodiment, as will be described later, by using such a conditional probability table and comparing the corresponding potential temperature pattern information and the wind-condition pattern information at the time of prediction (in detail, parameter that prescribes pattern information (corresponding to the state included in the node of the Bayesian network)) and the like with the state included in each matrix element of the conditional probability table, occurrence probability of prediction target weather information can be predicted.

Note that in the Bayesian network 20, since the corresponding potential temperature pattern information, the wind-convergence pattern information, the wind measurement pattern information, and the measured weather information are linked to an identical child node, the corresponding potential temperature pattern information and the measured weather information, the wind-convergence pattern information, the wind measurement pattern information and the measured weather information are associated with each other via the child node and stored.

Next, a method for generating the predicted weather information in the prediction target region will be described by using such Bayesian network 20. Here, a case of predicting the rainfall at each prediction point (the point A to the point X) obtained by dividing the prediction target region by the horizontal resolution described above is taken as an example.

In the present embodiment, the corresponding potential temperature pattern information based on altitude distribution of the corresponding potential temperature at the time of prediction 2' (corresponding potential temperature pattern information at the time of prediction) and the wind-condition pattern information based on wind-condition distribution information 3' (wind-condition pattern information at the time of prediction) are acquired at each prediction point. Subsequently, the conditional probability table (CPT) held by the nodes N6a to N6x of the Bayesian network 20 constructed in advance is compared with the corresponding potential temperature pattern information at the time of prediction and the wind-condition pattern information at the time of prediction at each prediction point. When one conditional probability (posteriori probability) in which these pieces of pattern information at the time of prediction all correspond to the states of the parent nodes N1 to N3 exists in the conditional probability table (CPT), this probability is defined as occurrence probability of rain at the corresponding prediction point.

Meanwhile, when a result of the comparison with the conditional probability table (CPT) differs from the above description, a plurality of conditional probabilities (posteriori probabilities) that has the states of the parent nodes N1 to N3 which are relevant to these pieces of pattern information at the time of prediction are extracted, and by combining the occurrence probabilities, occurrence probability of rain at the prediction point is calculated. Here, as a method for combining the plurality of occurrence probabilities, for example, a method using weighted average in consideration of correlativity between the pattern information at the time of prediction and a state that is a condition of the extracted conditional probability (posteriori probability) and the like.

Note that presence of relevance between the pattern information at the time of prediction and the states of the parent nodes N1 to N3 may be determined by the already described method or the like.

Then, based on the occurrence probability of rain calculated in this way, the predicted weather information regarding rainfall in the prediction target region is generated.

Here, the predictable weather phenomenon is rainfall because of the use of the Bayesian network 20 including the nodes with precipitation at the prediction points (point A to point X) as the random variable; however, of course, other weather phenomena can also be predicted by the method using the Bayesian network. In this case, the Bayesian network including the node that uses occurrence of the prediction target weather as the random variable may be constructed and prediction may be performed.

Also, the method using the Bayesian network 20 can perform not only prediction of a weather phenomenon but also calculation of probability that warning needs to be issued and probability that umbrella is needed on the condition of occurrence of this weather phenomenon. These pieces of information are useful for generating life information to be described later.

Also, in the Bayesian network 20, although each of the corresponding potential temperature pattern information, the wind-convergence pattern information, the wind-speed pattern information, the measured weather information, and the weather information according to user is described as one node like the nodes N1 to N5, each of these nodes does not necessarily need to be one node, and each node may be divided into a plurality of nodes according to the state each node can have.

Thus, when predicting the weather phenomenon by the method using the Bayesian network, the first calculation unit 12 of the database system 10 can predict the weather phenomenon in consideration of various pieces of information stored in the storage unit 11 by then. Also, the probability table representing the priori probability and posteriori probability is updated as appropriate, and thus it becomes possible to perform more accurate prediction with passage of time.

Furthermore, it is also possible to add a new node according to environmental (situational) changes of the prediction target region, which allows improvement in the prediction accuracy and change in the prediction target.

In addition, when the database system 10 includes the second calculation unit 13, the prediction accuracy information can be generated as described above, and this prediction accuracy information can also be incorporated into the Bayesian network as a new node, which can also improve the prediction accuracy.

Note that in the Bayesian network, addition of a new node can be made by a known method, and in this case, it is also useful to employ the Loopy BP method or the like depending on network structure.

Also, in each node that constitutes the Bayesian network, a relatively reliable node is intermingled with a relatively unreliable node, and a node having extremely low correlativity with other nodes may exist. In such a case, for example, configurations of nodes and links may be changed suitably based on the LK method (Learning model using domain knowledge) which is a known method, determination of correlativity based on Akaike's Information Criterion, and the like.

The database system 10 further includes the output unit 14. The output unit 14 is an apparatus having a function of sending outside a prediction result calculated by the first calculation unit 12 and life information associated with the prediction result. As a display device, the output unit 14 displays to a user the prediction result and the life information associated with the prediction result, and transmits the prediction result and the life information associated with the prediction result to the external reception terminal 6.

Therefore, preferably the life information that can be associated with the prediction result is also stored in the storage unit 11 of the database system 10. Note that the life information associated with the prediction result can be generated, for example, by the method using the Bayesian network. Of course, the life information may be generated by other methods, or existing information may also be taken in as the life information.

Also, the output unit 14 preferably transmits actual weather information at the time of transmitting information together with the prediction result.

Next, the reception terminal 6 included in the weather information providing system 1 according to the embodiment of the present invention will be described.

Figure 6:
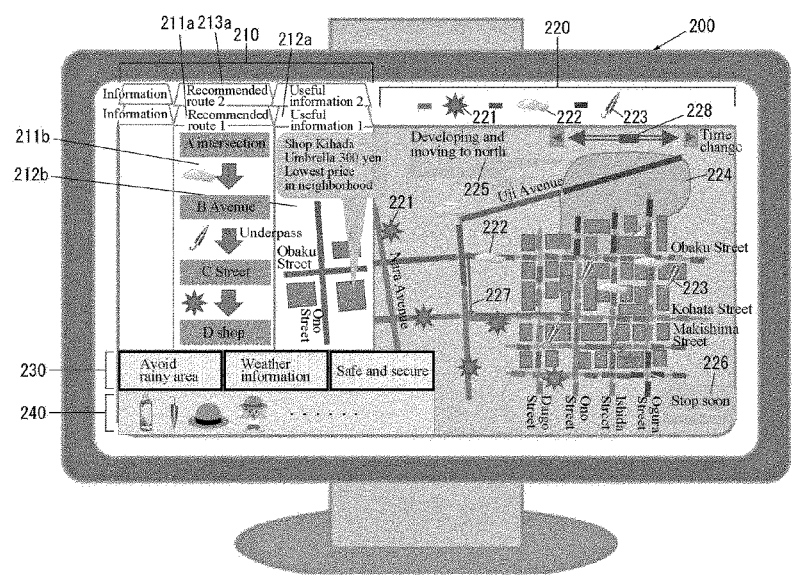
FIG. 6 is a schematic view illustrating one example of a display screen of a reception terminal included in the weather information providing system of the present invention.
Figure 7:
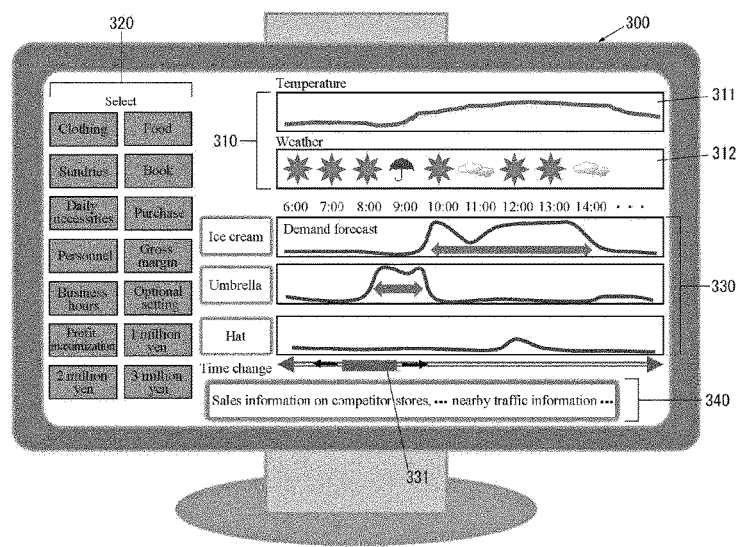
FIG. 7 is a schematic view illustrating another example of the display screen of the reception terminal included in the weather information providing system of the present invention.

FIGS. 6, 7 are each a schematic view illustrating a display screen of the reception terminal 6.

The reception terminal 6 is a personal computer in which a Web browser is introduced. When the Web browser is started and predetermined URL is designated, information in response to a request is transmitted from the output unit 14 of the weather information providing system 1, and windows 200, 300 as illustrated in FIGS. 6, 7 are displayed.

The window 200 is one example of a mainly individual user-oriented display screen.

In the window 200, an information selection-display section 210, a map display section 220, a command selection section 230, and an icon display section 240 are displayed on one screen.

A plurality of tabs for allowing selection of information to be displayed and information in response to the selected tab are displayed on the information selection-display section 210. For example, when a tab 211a of "recommended route 1" is selected, a recommended route 211b to a destination is displayed. When a tab 212a of "useful information 1" is selected, information useful to user 212b in response to prospected weather, for example, information indicating an umbrella shop in response to prediction of rain in the recommended route is displayed. Also, when the user selects another tab, such as a tab 213a of "useful information 2", information to be displayed is switched accordingly.

A map of a predetermined range and weather information in an area displayed on the map (current information and predicted weather information) are displayed on the map display section 220. For example, current weather of fine, cloudy, or rain is displayed with icons 221 to 223 or a color-coded area 224. In addition, movement prospect of a future rainy area, prospect of time when it stops raining, and the like are displayed in a form of comments 225, 226.

Also, information linked to the information selected with the tab of the information selection-display section 210 is also displayed. For example, when the tab 211a of "recommended route 1" is selected, a route 227 is displayed on the map.

An area to be displayed on the map display section 220 can be selected by the user, and can also be arbitrarily changed by operating a slider 228.

Buttons for selecting a command, such as "avoid rainy area", "weather information", and "safe and secure", are displayed on the command selection section 230, and by selecting a command, information in response to the selected command is displayed on the information selection-display section 210 or the map display section 220. For example, when "avoid rainy area" is selected, for example, information for avoiding rain and reaching a destination and the like are displayed on the information selection-display section 210 or the map display section 220. When "weather information" is selected, for example, weather information as illustrated on the map display section 220 of FIG. 6 and the like (current information and predicted information) are displayed. When "safe and secure" is selected, for example, information regarding warning and advisory which are currently issued, forecast of a place and time regarding occurrence of a local downpour, information on total rainfall exceeding certain quantity, and the like are displayed on the information selection-display section 210 or the map display section 220.

A plurality of icons are displayed on the icon display section 240, and by selecting an icon, information in response to the selected icon is displayed on the information selection-display section 210 or the map display section 220. For example, when a PET bottle icon is selected, a point of sale of drinking water is displayed on the information selection-display section 210 or the map display section 220, whereas when an umbrella icon is selected, a place where an umbrella is needed is displayed on the information selection-display section 210 or the map display section 220.

The user can arbitrarily set icons to be displayed on the icon display section 240.

The window 300 is one example of mainly business user-oriented display screen.

In the window 300, a weather forecast display section 310, a command selection section 320, a business information display section 330, and an information window 340 are displayed on one screen.

Temperature change prediction 311 and weather change prediction 312 are displayed on the weather forecast display section 310.

Buttons for selecting a command, such as "clothing", "sundries", "daily necessities", "personnel", "business hours", "profit maximization", and "two million yen", are displayed on the command selection section 320, and by selecting a command, information in response to the selected command is displayed on the business information display section 330. Note that although not illustrated, the command selection section 320 is developed into layers, when one command is selected, so as to display buttons for selecting a command that is obtained by further dividing the selected one command. Specifically, for example, when the clothing command is selected, buttons for selecting a command such as "men's clothing", "women's clothing", "children's clothing", "underwear", "hat" "glove", and "formal dress", which are obtained by further dividing the clothing, are displayed. In this case, the command selection section 320 may be developed into any number of layers.

Information that reflects predicted weather phenomenon (weather forecast) about the command selected on the command selection section 320 is displayed on the business information display section 330. For example, on the command selection section 320, when hat is selected, a graph displays that increase in demand is predicted at around 12:00 to 13:00 when fine weather is prospected, and when umbrella is selected, a graph displays that increase in demand is predicted at around 9:00 when rain is predicted. When ice cream is selected, a graph displays that demand will increase as temperature rises after 9:30, and in particular, further increase in demand is predicted at around 10:00 and at around 12:00 to 13:00 when temperature rises and fine weather is predicted. Also, on the business information display section 330, display time can also be changed by operating a slider 331.

Also, although not illustrated, for example, when business hours is selected on the command selection section 320, after increase or decrease in demand reflecting weather forecast is predicted, business hours suitable for gaining profit is displayed on the business information display section 330. For example, when two million yen is selected, after increase or decrease in demand reflecting weather forecast is predicted, a plan suitable for securing two million yen sales is displayed on the business information display section 330.

Business related information, such as nearby traffic information and sales information on competitor stores, is displayed on the information window 340, not to mention weather related information.

Thus, predicted weather information predicted by the database system 10 and life information associated with this predicted weather information, which is displayed on the windows 200, 300, are displayed on the display screen of the reception terminal 6. This allows the user to acquire the predicted weather information and the life information related thereto, and to select appropriate actions in consideration of acquired information.

An embodiment of the reception terminal included in the weather information providing system of the present invention is not limited to the above-described embodiment, but may undergo design changes as appropriate.

For example, information that is sent from the output unit of the database system and displayed on the reception terminal is not limited to information described above. For example, the predicted weather information, operation information of railroad and aircraft, and regulation information of highway and the like, which are related to the predicted weather information, may be displayed. The predicted weather information and information on holding a concert, sporting event, or the like related to the predicted weather information may be displayed. The predicted weather information and information on holding an event in an amusement park, pleasure resort, shopping mall, and the like which are related to the predicted weather information may be displayed.

Also, the reception terminal 6 of the weather information providing system 1 according to the embodiment of the present invention may include a GPS device, and in this case, the reception terminal 6 may be configured to receive only information according to positional information on the reception terminal 6.

Furthermore, attributes of the user, for example, gender, age, occupation, family structure, and the like, and personal information, for example, hobby and special ability, favorite food, transportation vehicle the user owns, and the like are registered in the reception terminal 6 in advance. The reception terminal 6 may be configured to receive only information according to these pieces of registration information.

Also, the above-described embodiment, which uses the Web browser to display the predicted weather information on the display section of the reception terminal, may use dedicated application software for displaying the predicted weather information. Of course, the reception terminal is not limited to a personal computer, but may be a smartphone, cellular phone, or the like.

Also, the weather information providing system 1 according to the embodiment of the present invention may use one terminal device into which functions as the transmission terminal 5 and functions as the reception terminal 6 are integrated.

Next, the air observation system according to the embodiment of the present invention will be described.

As described above, the wind-condition distribution information for acquiring the wind-condition pattern information, such as the wind-convergence pattern information 103a and the wind-speed pattern information 103b, can be calculated, for example, by using the air observation system 3.

The air observation system 3 includes a plurality of Doppler LIDARs 3a installed with a space from each other and the wind-condition calculation unit 3b that generates the wind-condition distribution information in the observation region based on an observation result made by each of the Doppler LIDARs 3a.

Hereinafter, an example in which the air observation system 3 is installed in an urban area will be described.

The air observation system 3 according to the embodiment of the present invention includes three Doppler LIDARs 3a installed in a predetermined positional relationship.

The Doppler LIDARs observe the wind condition (wind direction, wind speed) based on motion of aerosol by radiating a laser beam into the air and detecting Doppler shift of scattered light (reflected light) from the aerosol. The Doppler LIDARs can observe the wind condition regardless of whether it is raining.

Also, the Doppler LIDARs, which observe aerosol by using a laser beam, can perform observation superior in spatial resolution and time resolution.

Three Doppler LIDARs 3a are each installed on a roof of a skyscraper with a substantially identical height and spaced by a predetermined distance from each other. Three Doppler LIDARs 3a each calculate horizontal distribution information of the wind condition (wind direction and wind speed) based on a line of sight wind speed observed by each Doppler LIDAR 3a.

Calculation of the wind-condition distribution information is performed by the wind-condition calculation unit 3b.

Each Doppler LIDAR 3a is configured to cause the line of sight direction (direction to send the laser beam) to rotate 360° horizontally. Each Doppler LIDAR 3a observes, for example, the line of sight wind speed in a radius range of about 20 km successively (every minute) while rotating at a constant speed in a cycle of about one round (360°) per one minute.

Data of the line of sight wind speed obtained by each Doppler LIDAR 3a is transferred to a calculation unit including the wind-condition calculation unit 3b via a transmitter included in each Doppler LIDAR 3a.

As the calculation unit, a computer including a CPU, a storage unit such as a RAM, a ROM, and a HDD, and various input-output interfaces can be used. A receiver that receives an observation result of the line of sight wind speed measured by each of the plurality of Doppler LIDARs 3a, and a computer program for generating horizontal distribution information on the wind condition based on the received observation result are installed in this computer. Functions as the wind-condition calculation unit 3b are exhibited by the CPU executing the computer program.

The wind-condition calculation unit 3b combines the observation results of respective Doppler LIDARs 3a, and acquires, for example, the wind-speed image in the east-west direction (east-west wind-speed image) and the wind-speed image in the north-south direction (north-south wind-speed image) as wind-condition information in the observation region.

Here, various methods can be employed as a method for generating the wind-condition distribution information. For example, when the distribution information is generated based on data observed with three or more Doppler LIDARs, calculation may be performed by the maximum likelihood estimation method. Also, when the distribution information is generated based on data observed with two Doppler LIDARs, calculation may be performed by the weighted linear least squares method.

By these methods, the wind-condition calculation unit 3b calculates, for example, the wind-condition distribution information like the images illustrated in FIG. 4(*a*) 2 (east-west wind-speed image and north-south wind-speed image) every one minute.

Accordingly, when the wind-condition distribution information is calculated using the air observation system 3 and the pre-calculation unit 15 creates the wind-condition pattern information based on this information, the wind-condition pattern information 103 is stored in the storage unit 11 every one minute.

The wind-condition distribution information has horizontal resolution of about 100 m. With such horizontal resolution, when observation is performed in an urban area, the wind-condition distribution information will reflect the wind condition of one road in the observation result. The horizontal resolution is not limited to 100 m, and may be determined as appropriate in consideration of a situation of the ground surface in the observation region or the like.

Note that the horizontal resolution can be set as appropriate by a calculation method for generating a measurement condition of the Doppler LIDAR 3a (observation intervals) and the wind-condition distribution information.

The Doppler LIDAR 3a used in the air observation system 3 is not particularly limited, and a conventionally known Doppler LIDAR can be used. For example, a Doppler LIDAR using an infrared laser with a wavelength band of 1.5 µm that is often used in terms of high versatility of components can be used.

In the air observation system 3, an installation location of the Doppler LIDAR 3a is not particularly limited, and may be determined as appropriate in consideration of a situation of the ground surface in the observation region, performance of the Doppler LIDAR, and the like.

Since a laser beam does not reach a section that is a shadow of a shield due to characteristics thereof, the Doppler LIDAR 3a cannot perform measurement in this section. Accordingly, the Doppler LIDAR 3a needs to be installed at a height at which no shield exists in surroundings. For this reason, when installed in an urban area, the Doppler LIDAR 3a may be installed, for example, at a height of about 200 m.

Also, respective Doppler LIDARs 3a are preferably installed with a difference of the installation height of about 0 to 10 m. This is because there will be no large difference in the wind condition even if measurement heights differ when the difference of height is this level.

In the air observation system 3, the plurality of Doppler LIDARs 3a may be installed, and preferably three or more Doppler LIDARs 3a are installed in a predetermined positional relationship, although two Doppler LIDARs 3a may be installed.

This is because, while observation performed with two Doppler LIDARs in the observation region may cause an error in a measurement result depending on the wind direction inside the observation region, observation performed in the observation region by using three or more Doppler LIDARs allows measurement of the wind condition in the observation region with a smaller error.

This will be described by referring to a simulation result.

Figure 8:
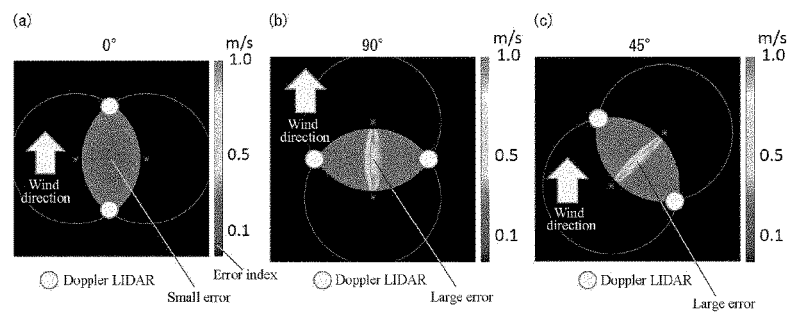
FIGS. 8 (a) to 8(c) are each a diagram illustrating a result of simulation of a measurement error when two Doppler LIDARs observe a wind of a specified wind direction in the air observation system of the present invention.
Figure 9:
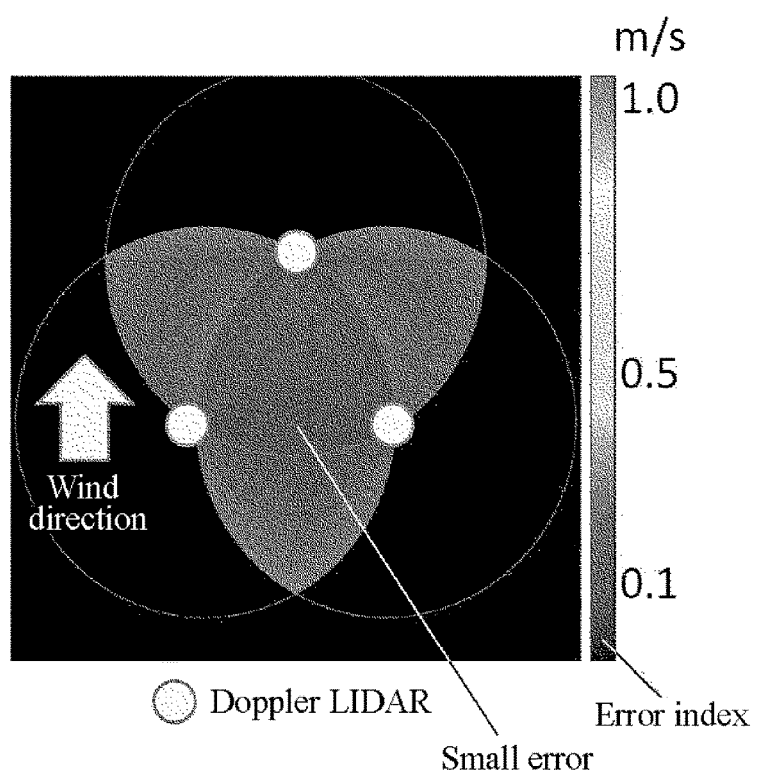
FIG. 9 is a diagram illustrating a result of simulation of the measurement error when three Doppler LIDARs observe the wind of the specified wind direction in the air observation system of the present invention.

FIGS. 8 (*a*) to (*c*) are each a diagram illustrating a result of simulation of measurement errors when two Doppler LIDARs observe a wind of a specified wind direction in color images. FIG. 9 is a diagram illustrating a result of simulation of a measurement error when three Doppler LIDARs observe a wind of a specified wind direction in color images.

Note that this simulation is performed assuming that a line of sight wind-speed error of a stand-alone Doppler LIDAR is 0.1 m/s.

The simulation results of the observation performed with two Doppler LIDARs indicate that, as illustrated in FIG. 8, when a line that connects between the Doppler LIDARs and the wind direction are parallel with each other (angle made between the line that connects between Doppler LIDARs and the wind direction is 0°), the measurement error is extremely small (refer to FIG. 8 (*a*)). Meanwhile, when an angle made between the line that connects between the Doppler LIDARs and the wind direction is 45° or 90°, the measurement error increases near a region that has mostly equal distances from respective Doppler LIDARs (refer to FIG. 8 (*b*), (*c*)).

On the other hand, the simulation result of the observation performed by three Doppler LIDARs indicate that, as illustrated in FIG. 9, disposition of the Doppler LIDARs to cause each Doppler LIDAR to be positioned at a vertex of a regular triangle leads to extremely small measurement error.

Therefore, in the air observation system 3, while a region observed with at least two Doppler LIDARs may be used as the observation region, a region observed with three or more Doppler LIDARs is preferably used as the observation region.

Also, from the above-described simulation results, when three or more Doppler LIDARs are installed, disposition of the Doppler LIDARs to cause each Doppler LIDAR to be positioned at a vertex of a regular triangle is considered to be optimum.

Meanwhile, when each Doppler LIDAR 3*a* is installed on a roof of a structure, such as a building, to operate the air observation system 3, each Doppler LIDAR 3*a* does not necessarily be disposed so as to be positioned at a vertex of a regular triangle. Accordingly, in actual operations, respective Doppler LIDARs 3*a* are preferably installed with as small measurement error as possible, smaller number of Doppler LIDARs 3*a*, and wider range as the observation region.

Therefore, the following describes a preferable method as a determination method of the installation position (observation point) of the Doppler LIDARs 3*a* in the air observation system 3.

First, an observation point (observation point A) that can cover the observation region most widely with one Doppler LIDAR 3*a* is determined.

Next, an observation point that is inside a region the Doppler LIDAR installed at observation point A can observe and is farthest from observation point A (observation point B) is determined.

Next, one observation point is selected and defined as a new observation point (observation point C), addition of which allows the measurement error to be equal to or less than a preset allowable error Th (for example, about 0.1 to 0.2 m/s) and allows an observable region to expand most. Note that since the measurement error varies with the wind direction, the greatest measurement error for all the wind directions is defined as an error made by addition of the new observation point.

Subsequently, a method similar to the method for selecting the observation point C is repeatedly performed to add new observation points sequentially (observation point D, E, F, . . . ).

Then, when an area of the observable region that expands by addition of the new observation points becomes equal to or less than a preset area, addition of the new observation points is finished.

Also, addition of the observation points may be finished when a planned entire observation target region is able to be covered.

By determining the installation positions of the Doppler LIDARs (observation points) by using such a method, an efficient (observation measurement, cost performance) air observation system can be constructed.

Figure 10:
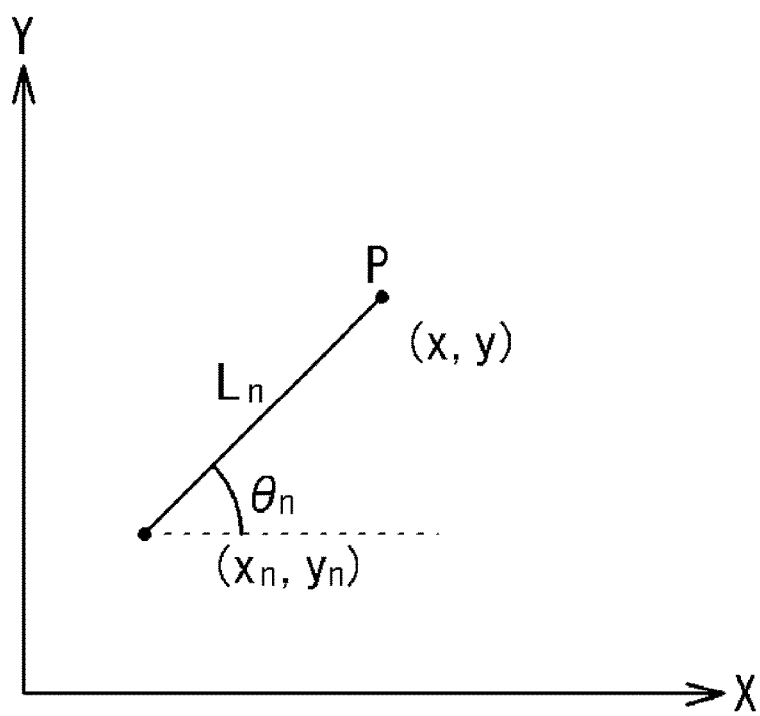
FIG. 10 is a reference diagram for describing a calculation method of horizontal wind speed in the air observation system of the present invention.

Also, in the above-described method, the measurement error caused by addition of a new observation point may be calculated by the following method. FIG. 10 is a reference diagram for describing a calculation method of horizontal wind speed in the air observation system of the present invention.

First, horizontal wind speed (east-west wind u, north-south wind v) is calculated by using the Doppler LIDARs installed at N points. Here, it is assumed that the east-west direction and the north-south direction are X direction and Y direction in FIG. 10, respectively, installation coordinate of each LIDAR is $(x_n, y_n)$, and the line of sight direction wind speed obtained is $v_{rn}$. In this case, the installation coordinate of each LIDAR $(x_n, y_n)$ and a point P $(x, y)$ separated by $L_n$ from the installation coordinate of each LIDAR satisfy the following relationships (3) to (5).

[Equation 4]

$$L_n = \sqrt{(x-x_n)^2 + (y-y_n)^2} \quad (3)$$

$$\cos \theta_n = (x-x_n)/L_n \quad (4)$$

$$\sin \theta_n = (y-y_n)/L_n \quad (5)$$

Then, the east-west wind u and the north-south wind v which are estimated at the point P $(x, y)$ are calculated by the weighted least squares method by the following formulas (6), (7).

[Equation 5]

$$u(x, y) = \sum_{m=1}^{N}\left[w_m\left\{\left(\sum_{n=1}^{N} w_n \sin^2\theta_n\right)\cos\theta_m - \left(\sum_{n=1}^{N} w_n \cos\theta_n \sin\theta_n\right)\sin\theta_m\right\}v_{rm}\right] \quad (6)$$

$$v(x, y) = \sum_{m=1}^{N}\left[w_m\left\{\left(\sum_{n=1}^{N} w_n \cos^2\theta_n\right)\sin\theta_m - \left(\sum_{n=1}^{N} w_n \cos\theta_n \sin\theta_n\right)\cos\theta_m\right\}v_{rm}\right] \quad (7)$$

At this time, when weight to each Doppler LIDAR is $w_n$, the weight $w_n$ can be selected from either one of the following equation (8) (in the equation, A is an arbitrary constant) and the following equation (9).

[Equation 6]

$$w_n = A / L_n^2 \quad (8)$$

[Equation 7]

$$w_n = 1 \text{ when } L_n \le L_{n\_max} \quad (9)$$
$$\quad = 0 \text{ when } L_n > L_{n\_max}$$

Then, when it is assumed that the observation error of each Doppler LIDAR (before weighting) is constant ($=\Delta v_r$), an east-west wind error $\Delta u$ (x, y) and north-south wind error $\Delta v$ (x, y) can be calculated by the following formulas (10) and (11), respectively.

[Equation 8]

$$\Delta u(x, y) = \sum_{m=1}^{N} \left| w_m \left\{ \left( \sum_{n=1}^{N} w_n \sin^2\theta_n \right) \cos\theta_m - \left( \sum_{n=1}^{N} w_n \cos\theta_n \sin\theta_n \right) \sin\theta_m \right\} \right| \Delta v_r \quad (10)$$

$$\Delta v(x, y) = \sum_{m=1}^{N} \left| w_m \left\{ \left( \sum_{n=1}^{N} w_n \cos^2\theta_n \right) \sin\theta_m - \left( \sum_{n=1}^{N} w_n \cos\theta_n \sin\theta_n \right) \cos\theta_m \right\} \right| \Delta v_r \quad (11)$$

Then, from the east-west wind error $\Delta u$ (x, y) and the north-south wind error $\Delta v$ (x, y), the maximum value of the measurement error is [Equation 9].

$$\sqrt{\Delta u^2 + \Delta v^2} \quad \text{[Equation 9]}$$

As described above, an area of the region where the maximum value of the measurement error becomes equal to or less than the allowable error Th that is set in advance when the Doppler LIDAR is newly added is calculated for each point at which the Doppler LIDAR can be installed, and an observation point with the most expanded observable region is set as a new observation point (observation point C).

An embodiment of the air observation system of the present invention is not limited to the above-described embodiment, but may undergo design changes as appropriate.

For example, in the air observation system 3, the Doppler LIDAR 3a radiates a laser beam horizontally, and observes the wind condition at a height identical to the installation height of the Doppler LIDAR by scanning surroundings thereof. However, in the air observation system of the present invention, a scanning direction by the Doppler LIDAR is not necessarily limited to a horizontal direction, and the Doppler LIDAR 3a may radiate a laser beam obliquely upward and perform scanning similarly. In this case, vertical distribution information on the air information, such as the wind condition, can be observed. Also, a radiation direction of the laser beam may be changed for each scan.

Observation of the air using such an air phenomenon observation system enables acquisition of the wind-condition distribution information for creating the wind-condition pattern information used in the database system of the present invention.

A weather forecasting system according to the embodiment of the present invention is a weather forecasting system including the already described database system 10 and the air observation system 3. The wind-condition distribution information in the prediction target region used in the database system 10 is the wind-condition distribution information acquired by the air observation system 3.

Such a weather forecasting system is also one of the present invention.

Next, a weather forecasting system 1A according to another embodiment of the present invention will be described. This weather forecasting system 1A uses hardware identical to hardware of the weather forecasting system 1 of the above-described embodiment, and thus detailed description of hardware structure will be omitted. Note that the database system 10 in the weather forecasting system 1 functions as a weather forecasting system 10A in the weather forecasting system 1A. Also, the weather forecasting system 1A is configured not to use the second calculation unit 13 described in the above embodiment, but to use data regarding the corresponding potential temperature calculated by the pre-calculation unit 15 and to output a result of probabilistic prediction calculated by the first calculation unit from the output unit 14.

Figure 11:
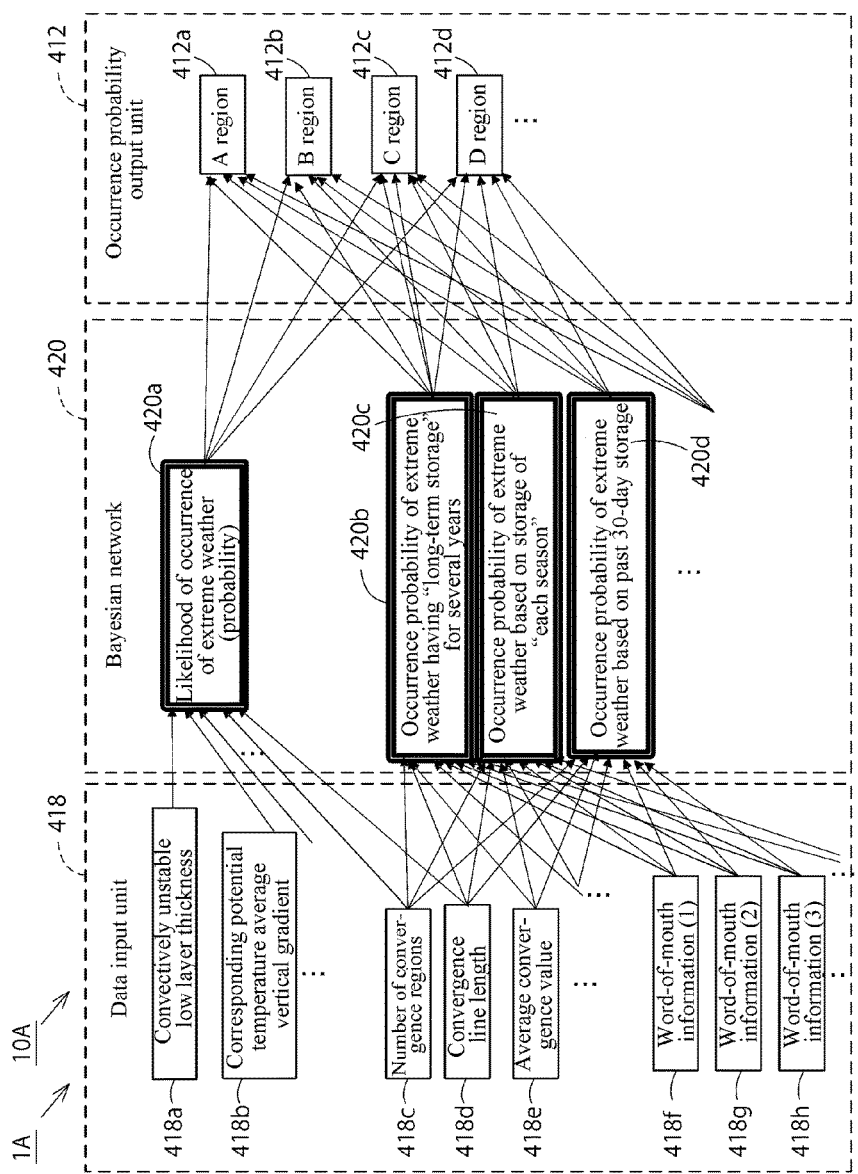
FIG. 11 is a block diagram illustrating a configuration of the Bayesian network.

FIG. 11 is a block diagram illustrating a configuration of a Bayesian network 420 of the weather forecasting system 1A. The Bayesian network 420 acquires, from a data input unit 418, corresponding potential temperature associated data (convectively unstable low layer thickness 418a, corresponding potential temperature average vertical gradient 418b), LIDAR observation data by Doppler LIDAR (wind-condition information including the number of convergence regions 418c, convergence line length 418d, average convergence value 418e), and manual entry data (word-of-mouth information (1) 418f, word-of-mouth information (2) 418g, word-of-mouth information (3) 418h). These pieces of data are input from the Meteorological Agency model data 2, the air observation system 3, the Meteorological Agency observation data 4, and the transmission terminal 5, and the like described with FIG. 1.

The Bayesian network 420 is a calculation unit that performs probabilistic prediction from various viewpoints. The Bayesian network 420 includes likelihood of occurrence of extreme weather (probability) 420a, occurrence probability of extreme weather having "long-term storage" for several years 420b, occurrence probability of extreme weather based on storage of "each season" 429c, and occurrence probability of extreme weather based on past 30-day storage 420d, and the like. The occurrence probability used in this Bayesian network 420 is not limited to these occurrence probabilities, and appropriate occurrence probability can be added as appropriate to constitute the Bayesian network 420.

An occurrence probability output unit 412 outputs prediction target weather information (phenomenon to occur) for each prediction target region (A region 412a, B region 412b, C region 412c, D region 412d).

Figure 12:
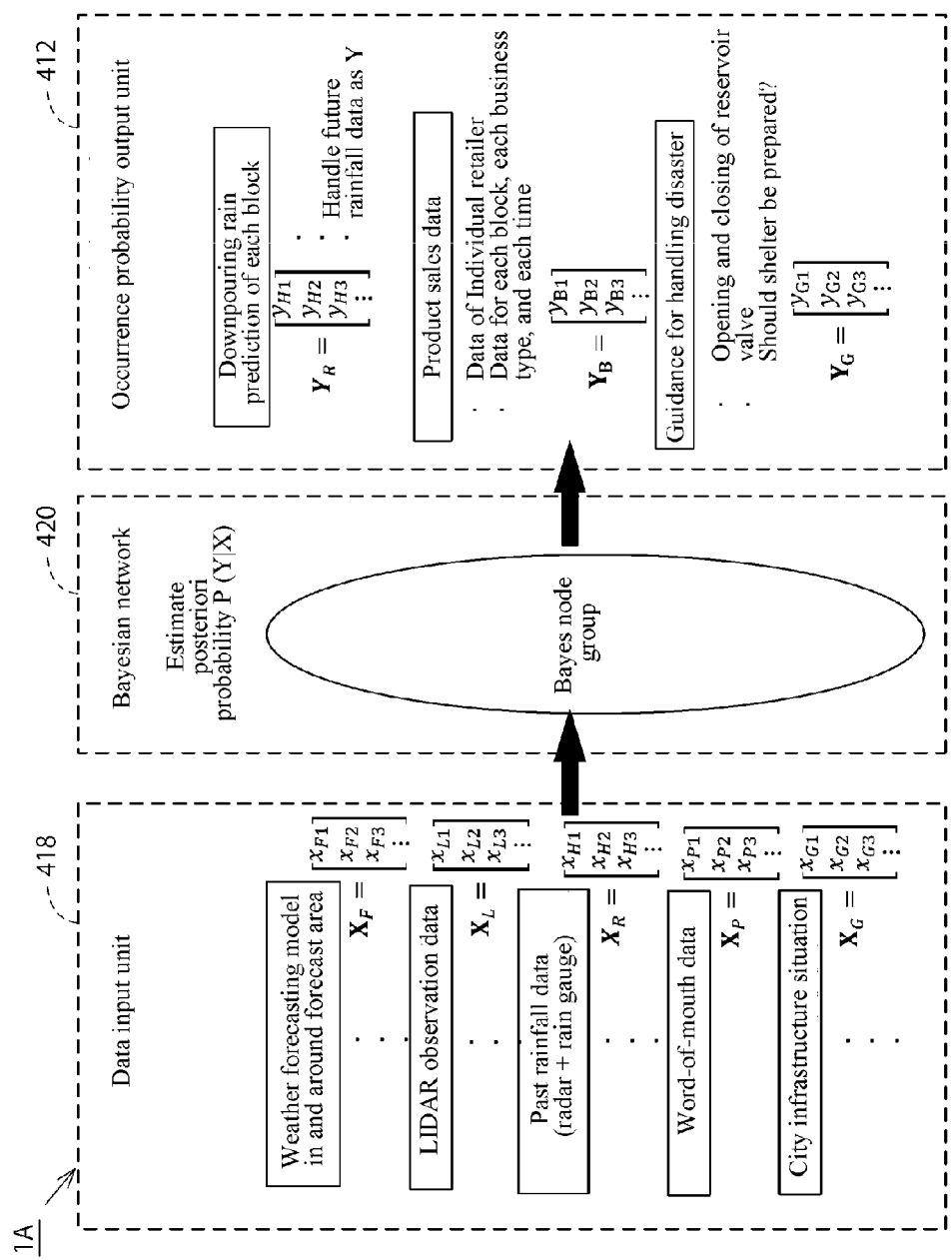
FIG. 12 is a block diagram illustrating the configuration of the Bayesian network.

FIG. 12 is a block diagram illustrating the configuration of the Bayesian network 420 from a viewpoint of input and output of data, and arithmetic equations.

The data input unit 418 acquires and inputs into the Bayesian network 420 a weather forecasting model $X_F$ in and around the prediction area, LIDAR observation data observed by Doppler LIDAR $X_L$, past rainfall data composed of past radar information and rain gauge information $X_R$, word-of-mouth data $X_P$, and city infrastructure situation $X_G$. Universal set of observed values of data acquired by this data input unit 418 is X (nodes without parents). Here, data to be input from the weather forecasting model $X_F$ includes information that allows determination of whether the air state is unstable, that is, information regarding the corresponding potential temperature. Also, data to be input as the LIDAR observation data $X_L$ includes information regarding wind convergence that causes ascending air current occurrence.

The occurrence probability output unit 412 outputs occurrence probabilities of phenomena, such as downpour prediction of each block $Y_R$ calculated by the Bayesian network 420, product sales data $Y_B$, and guidance for handling disaster $Y_G$. Universal set of amount to be estimated for data that is output from the occurrence probability output unit 412 is Y (nodes without children).

The Bayesian network 420 includes a Bayes node group that indicates probability of state transition from various pieces of data that are input from the data input unit 418 (nodes without parents) to phenomena (nodes without children) that are objects of which the occurrence probability output unit 412 outputs occurrence probabilities, and estimates posteriori probability P (Y|X).

This Bayesian network 420 uses the conditional establishment table (CPT) described with (b) of FIG. 5C in the above embodiment. Since this point is identical to the above embodiment, detailed description thereof will be omitted.

Figure 13:
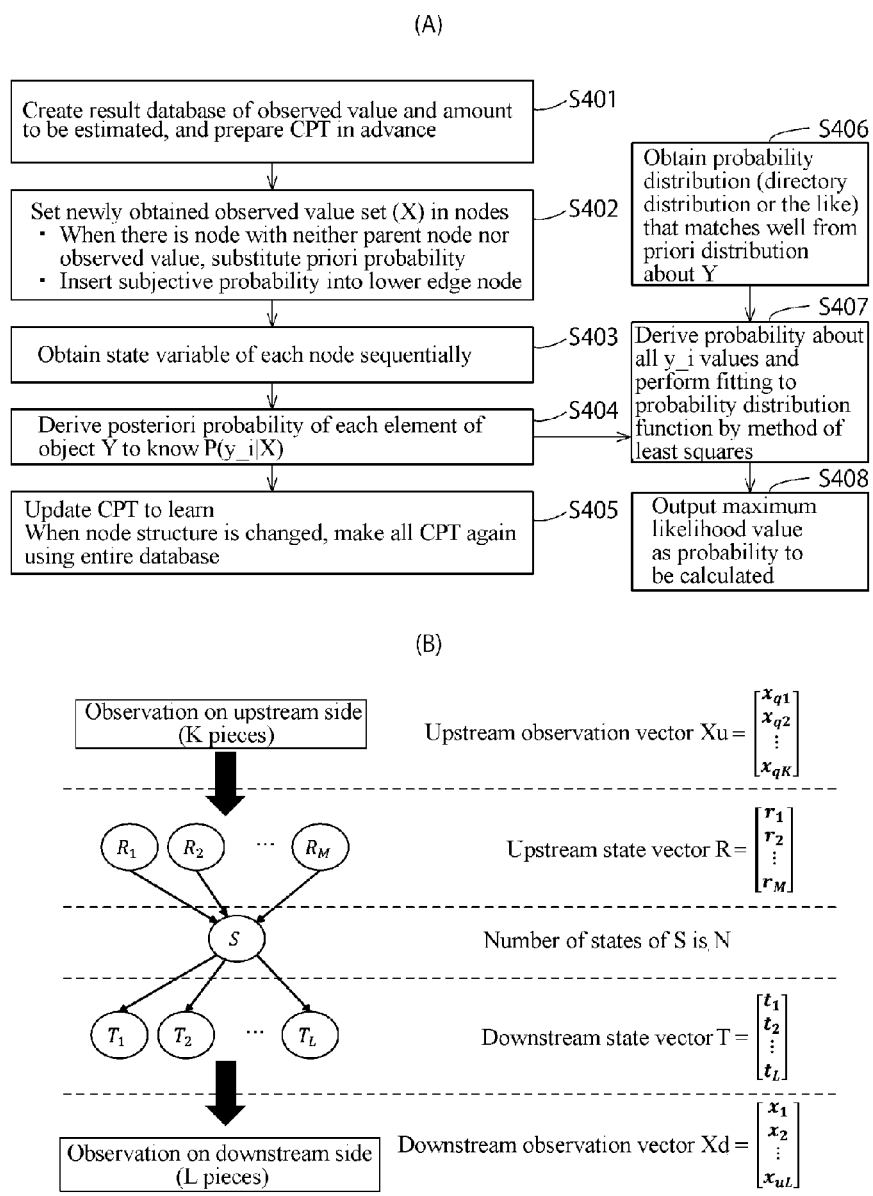
FIG. 13 is an explanatory diagram illustrating Bayesian filtering estimation using a conditional establishment table (CPT).

FIG. 13 is an explanatory diagram illustrating Bayesian filtering estimation that uses the conditional establishment table (CPT). FIG. 13 (A) is a flowchart illustrating a flow of the Bayesian filtering estimation, whereas FIG. 13 (B) is an explanatory diagram illustrating vectors of respective nodes in the state estimation method.

As illustrated in FIG. 13 (A), the weather forecasting system 10A acquires observed values, and creates a result database of an amount to be estimated by calculation of the corresponding potential temperature by the pre-calculation unit 15 (refer to FIG. 1), (step S401).

In the weather forecasting system 10A, the first calculation unit 12 (refer to FIG. 1) sets an observed value set (X) newly obtained in step S401 in the nodes (step S402). Here, when there is a node with neither parent node nor observed value, a priori probability is substituted. Also, subjective probability (probability determined subjectively in advance) is also inserted into a lower edge node.

In the weather forecasting system 10A, the first calculation unit 12 (refer to FIG. 1) obtains a state variable of each node sequentially (step S403). In the weather forecasting system 10A, the first calculation unit 12 (refer to FIG. 1) derives a posteriori probability of each element of object Y to know P(y_i|X) (step S404).

In the weather forecasting system 10A, the first calculation unit 12 (refer to FIG. 1) updates the conditional establishment table (CPT) to learn. When node structure is changed here, all the conditional establishment tables (CPT) are made again using the entire database (step S405).

Also, in the weather forecasting system 10A, the first calculation unit 12 (refer to FIG. 1) obtains probability distribution (directory distribution or the like) that often matches from priori distribution about Y (step S406).

In the weather forecasting system 10A, after acquiring P (yi|X) obtained in the step S404, the first calculation unit 12 (refer to FIG. 1) derives probability about all the yi values and performs fitting to a probability distribution function by the method of least squares (S407).

In the weather forecasting system 10A, the first calculation unit 12 (refer to FIG. 1) outputs a maximum likelihood value as probability to be calculated (step S408).

In accordance with the above flowchart, the conditional establishment table (CPT) can always be updated and the maximum likelihood value can be output as probability to be calculated.

FIG. 13 (B) illustrates the state estimation method of each node. From K pieces of data obtained by observation on an upstream side (weather forecast model, LIDAR observation data, past rainfall data, word-of-mouth data, city infrastructure situation, and the like), an upstream observation vector is provided as $X_u = [x_{q1}, x_{q2}, \ldots, x_{qk}]$.

An upstream state vector is provided as $R = [r_1, r_2, \ldots, r_M]$.

The number of states of S is N.

A downstream state vector is provided as $T = [t_1, t_2, \ldots, t_L]$.

As L pieces of data obtained by observation on a downstream side (downpour prediction, product sales data, guidance for handling disaster, and the like), a downstream observation vector is provided as $x_d = [x_1, x_2, \ldots, x_{uL}]$.

Here, since upstream $X_u$ and downstream Xd are conditionally independent, the following equation (12) holds true.

$$P(S = S_n) = A \times P(X_u \mid S = S_n) P(S = S_n \mid X_d) \qquad (12)$$
$$= A \times \omega_u(S = S_n) \omega_d(S = S_n)$$

\* A denotes a constant that normalizes likelihood to a probability value.

$\omega_u(S_n)$ and $\omega_d(S_n)$ denote contribution of upstream and downstream observation to S.

Then, $\omega_u(S=S_n)$, $\omega_d(S=S_n)$ can be calculated by the following equation (13), equation (14).

[Equation 10]

$$\omega_u(S = S_n) = \sum_{i=1}^{\prod_{j=1}^{M} N_{R_j}} P(S = S_n \mid R = r_i) P(R = r_i \mid X_u) \qquad (13)$$

[Equation 11]

$$\omega_d(S = S_n) = \sum_{i=1}^{\prod_{j=1}^{L} N_{U_j}} P(T = u_i \mid S = S_n) P(T = t_i \mid X_d) \qquad (14)$$

As a method of solution thereof, when an observed value is provided to a node, the value is introduced into the node. When an observed value is not provided to a most upstream node, a priori probability is introduced. When an observed value is not provided to a most downstream node, uniform distribution is introduced as no information. Furthermore, when there is an upstream or downstream node, by applying the above equations recursively, state probabilities of all the network nodes are obtained.

Note that in a network that does not have a loop when an arrow direction is not considered, the Bayesian network can be solved only by the above method. In this implementation, when the arrow direction is not taken into consideration, a loop is generated. Therefore, for example, a method such as the Loopy BP method is introduced to support double coupling network.

Figure 14:
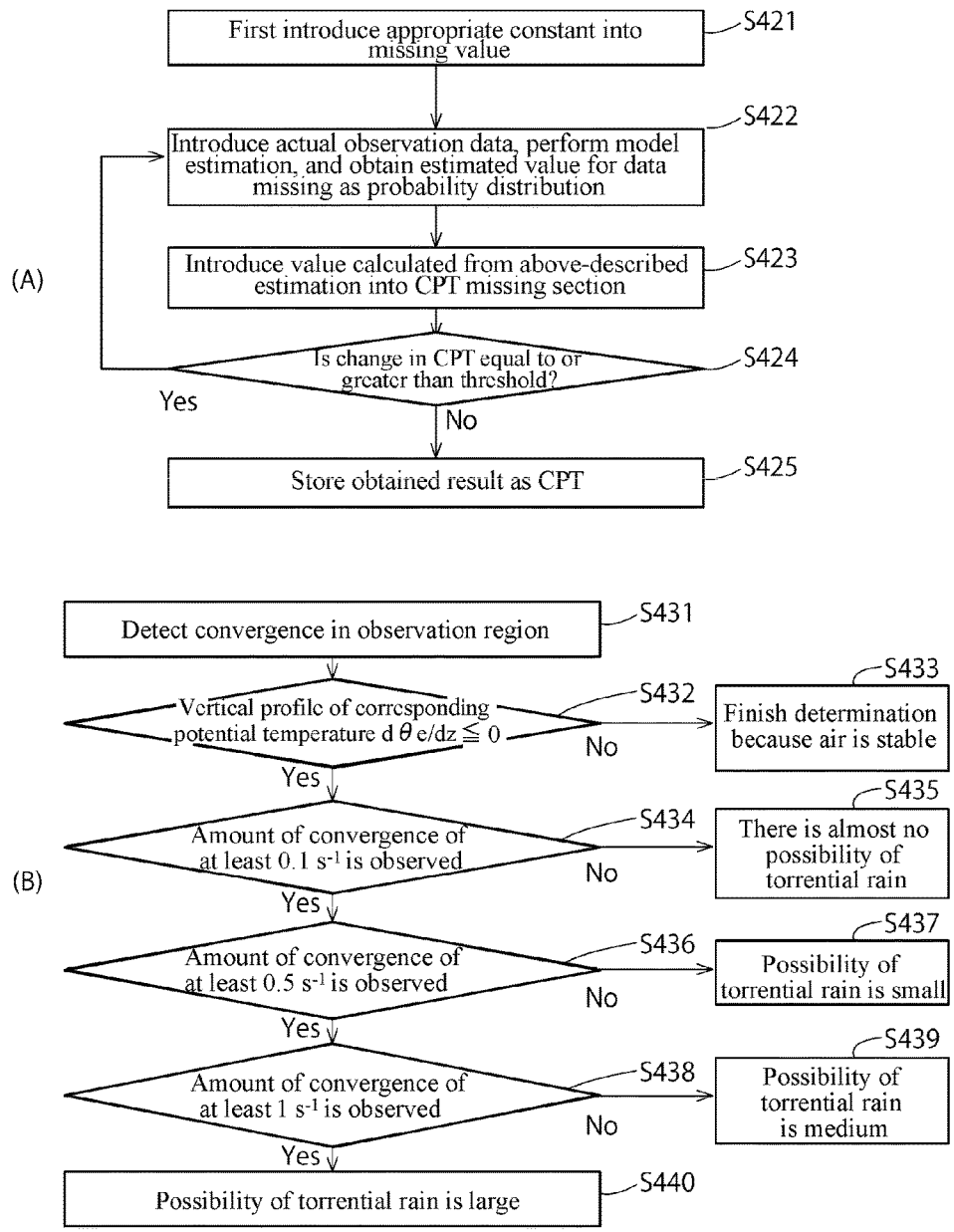
FIG. 14 is a flowchart of a maintenance process of the conditional probability table (CPT).

FIG. 14 (A) is a flowchart illustrating a maintenance process of the conditional probability table (CPT) to be executed by the first calculation unit 12 of the weather forecasting system 10A (refer to FIG. 1).

In an initial step of the maintenance process, the first calculation unit 12 introduces an appropriate constant into a missing value (step S421). Here, if data volume is not sufficient and the data does not fill all elements of the CPT, an expected value of unobserved data is calculated by an iteration method to eliminate the missing value in advance.

The first calculation unit 12 introduces actual observation data, performs model estimation, and obtains an estimated value for data missing as probability distribution (step S422).

The first calculation unit 12 introduces the value calculated from the above-described estimation into a missing section of the conditional probability table (CPT) (step S423).

The first calculation unit 12 determines whether a change in the conditional probability table (CPT) is equal to or greater than a threshold, and when the change is equal to or greater than the threshold (step S424: Yes), the first calculation unit 12 returns to step S422 and repeats the process.

When the change is not equal to or greater than the threshold (step S424: No), the first calculation unit 12 stores an obtained result as the conditional probability table (CPT) (step S424).

Thus, by executing loop learning, the conditional probability table (CPT) can always be updated, and accuracy can be improved with passage of time.

Note that in order to minimize network loop structure, preferably, conditional probability between links is calculated and a node with poor correlation is removed based on information criteria (known information criteria or the like).

Also, about node addition, since fake correlation may occur only by data learning, knowledge (paper, user) or the like is preferably combined, and the LK method (Learning model using domain Knowledge) or the like can be used.

Also, preferably, reliable information, such as data used for achievement of an academic paper, is additionally learned to reinforce the CPT.

FIG. 14 (B) is a flowchart for determining possibility of torrential rain to be executed by the first calculation unit 12 of the weather forecasting system 10A (refer to FIG. 1).

The first calculation unit 12 detects convergence in the observation region (step S431), and determines whether the air is stable by using the corresponding potential temperature vertical profile (step S432). When the vertical profile does not satisfy a condition of $d\theta e/dz \leq 0$ (step S432: No), the air is stable, and thus the first calculation unit 12 finishes the determination (step S433).

When the vertical profile satisfies the condition of $d\theta e/dz \leq 0$ (step S432: Yes), the air is unstable, and thus the first calculation unit 12 starts a prediction process for predicting the possibility of torrential rain. This prediction process makes a determination by using estimation information obtained using the above-described Bayesian network 420.

If an amount of convergence of at least $0.1\ s^{-1}$ is not observed at a time in a certain region by the estimation information (step S434: No), the first calculation unit 12 determines that there is almost no possibility of torrential rain (step S435).

When the amount of convergence of at least $0.1\ s^{-1}$ is observed (step S434: Yes) and the amount of convergence of at least $0.5\ s^{-1}$ is not observed (step S436: No), the first calculation unit 12 determines that the possibility of torrential rain is small at the time in the region (step S437).

When the amount of convergence of at least $0.5\ s^{-1}$ is observed (step S436: Yes) and the amount of convergence of at least $1\ s^{-1}$ is not observed (step S438: No), the first calculation unit 12 determines that the possibility of torrential rain is medium at the time in the region (step S439).

When the amount of convergence of at least $1\ s^{-1}$ is observed (step S438: Yes), the first calculation unit 12 determines that the possibility of torrential rain is large at the time in the region (step S440).

Figure 15:
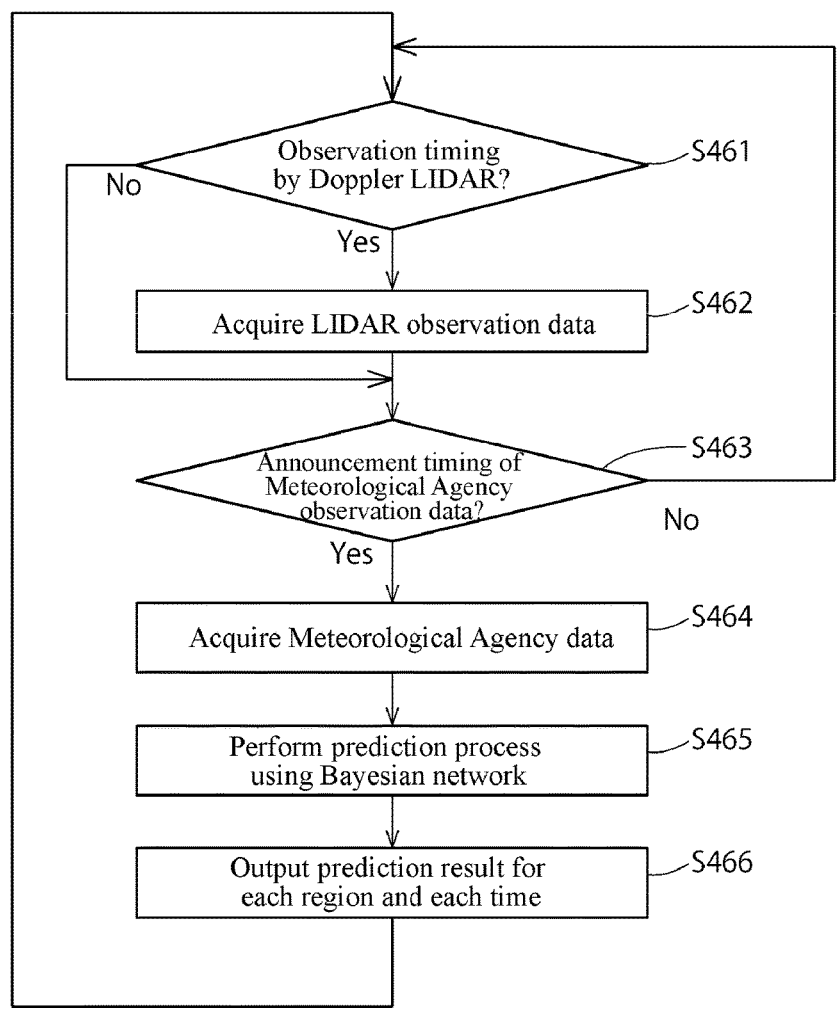
FIG. 15 is a flowchart of an operation in which a first calculation unit of a weather forecasting system controls acquisition of observation data and execution timing of a prediction process.

FIG. 15 is a flowchart of an operation in which the first calculation unit 12 of the weather forecasting system 10A (refer to FIG. 1) controls acquisition of the observational data and execution timing of the prediction process.

At observation timing by the Doppler LIDAR (step S461: Yes), the first calculation unit 12 acquires LIDAR observation data by the Doppler LIDAR (step S462). This observation timing can be appropriate timing composed of a time shorter than announcement intervals of weather data by the Meteorological Agency, such as every one minute, every five minutes, and every ten minutes (this can be half or less and is preferably ⅕ or less, and more preferably ¹⁄₁₀ or less). Also, acquisition of the LIDAR observation data can be an appropriate process, such as acquisition only by storage in the storage unit 11 (refer to FIG. 1), or taking into the Bayesian network 420 and performing data assimilation each time. Also, the LIDAR observation data to be acquired here can be the wind-condition pattern information 103 including the wind-convergence pattern information 103a (refer to FIG. 1) and the wind-speed pattern information 103b, or observation data itself for obtaining the wind-condition pattern information 103 (wind speed, wind direction, and the like in each target region at observation time).

After acquisition of the LIDAR observation data, or when timing is not the observation timing in step S461, the first calculation unit 12 returns the process to step S461 until announcement timing of the Meteorological Agency observation data, and stands by (step S463: No).

At the announcement timing of the Meteorological Agency observation data (for example, every three hours) (step S463: Yes), the first calculation unit 12 acquires the Meteorological Agency observation data (step S464). This Meteorological Agency observation data includes appropriate information, such as information including atmospheric pressure and temperature for calculating the corresponding potential temperature, rainfall information, measured weather information 104 (refer to FIG. 1), and the like. Also, this Meteorological Agency observation data includes data measured 2 hours and 30 minutes before announcement time, and weather data forecasted at every hour from 2 hours and 30 minutes before until 39 hours after.

The first calculation unit 12 performs the prediction process using the Bayesian network 420 (step S465). This prediction process performs estimation using the Bayesian filtering by using the Meteorological Agency observation data including the corresponding potential temperature and the wind-condition data by the Doppler LIDAR as input data, and forecast information at predetermined time intervals (for example, every one minute, every five minutes, or every ten minutes) from current time to predetermined time ahead (for example, three hours ahead, six hours ahead) as output data. This estimation is performed by each process described with FIG. 13 (A), FIG. 13 (B), FIG. 14 (A), and FIG. 14 (B).

The first calculation unit 12 outputs the prediction result for each region and each time (step S466). This output can be appropriate output, such as output in a form of performing data transmission to the external reception terminal 6 (refer to FIG. 1) as described in the above embodiment.

Besides this, correlation, corresponding potential temperature, and the like undergo a process identical to the process of the above embodiment, and thus detailed description thereof will be omitted.

By using the above configuration and operation, in a second embodiment, until the air enters an unstable state in which a local downpour can occur, only stability of the air is determined, and after a stage in which the state of the air becomes unstable, the prediction process using the Bayesian network 420 that needs complicated calculation can be performed. This allows appropriate forecasting while reducing a calculation load.

Also, the Bayesian network 420 can make a forecast by taking into consideration the wind-convergence information with the LIDAR observation data, enabling accurate prediction of a local downpour in advance. That is, in a state where the air is unstable (state where warm, moist air exists in a lower layer), in a section where wind is convergent, when predetermined strong ascending air current occurs for a predetermined time period, a local downpour occurs around a section where the ascending air current occurs. This is because, when wind converges horizontally, the converged wind will flow upward or downward, however, since there is the ground below, the wind can flow only upward, which causes strong ascending air current. When moisture of the raised warm, moist air is saturated, the moisture becomes waterdrops and falls at once, which will be a local downpour. Occurrence of a local downpour by this relationship is predicted for each small region by using the Bayesian filtering (occurrence probability of node) based on instability of the air by the Meteorological Agency observation data and the Bayesian filtering based on the wind convergence (occurrence probability of node), and thus a local downpour can be predicted accurately in a region smaller than a region for general weather forecast.

Also, weighting according to characteristic of data about correlation or the like enables accurate prediction.

Also, while conventional weather forecast is not able to perform calculation unless under rules that observed values may not have correlation, the present invention is able to weight and perform calculation appropriately even if observed values have correlation. In particular, by using the Bayesian network 420 that estimates probability using vectors with direction and strength, singular vectors can be extracted, and a local downpour or the like can be detected accurately and a little early. That is, there is a problem that, when making a forecast of a local downpour, for example, warning issued ten minutes before a local downpour or the like is too late to take in laundries. Meanwhile, by making a forecast including a forecast long time ahead (three hours ahead, six hours ahead, or the like), a situation where measures cannot be taken timely due to a last-minute forecast can be prevented.

Also, since the conditional probability table (CPT) can be updated automatically as needed, a highly-accurate forecast can be made with passage of time period.

INDUSTRIAL APPLICABILITY

This invention can be used for industries that make a weather forecast, for example, prediction of a local downpour or the like, and industries that apply results of the weather forecast.

REFERENCE SIGNS LIST

1: Weather information providing system
2: Meteorological Agency model data
3: Air observation system
3a: Doppler LIDAR
3b: Wind-condition calculation unit
4: Meteorological Agency observation data
5: Transmission terminal
6: Reception terminal
10: Database system
11: Storage unit
12: First calculation unit
13: Second calculation unit
14: Output unit
15: Pre-calculation unit
20, 20': Bayesian network
21: Conditional probability table
102, 2': Corresponding potential temperature pattern information
103, 3': Wind-condition pattern information
103a: Wind-convergence pattern information
103b: Wind-speed pattern information
104: Measured weather information
105: Weather information
200, 300: Window
210: Information selection-display section
220: Map display section
230: Command selection section
240: Icon display section
211a, 212a, 213a: Tab
221 to 223: Icon
224: Color-coded area
225, 226: Comment
227: Route
228: Slider
310: Forecast display section
320: Command selection section
330: Information display section
340: Information window
311: Temperature change prediction
312: Weather change prediction
331: Slider

The invention claimed is:

1. A weather forecasting system for predicting a weather phenomenon in a prediction target region, the weather forecasting system comprising:
   a storage unit configured to store wind-condition information and measured weather information, the wind-condition information being based on information obtained from an air observation system using Doppler LIDAR; and
   a first calculation unit, the first calculation unit configured to generate predicted weather information including presence of a local downpour based on information related to wind convergence included in the wind-condition information and information related to instability of air included in the measured weather information,
   wherein the wind-condition information is obtained from the air observation system using Doppler LIDAR to determine wind-convergence pattern information and wind-speed pattern information by combining wind speed images of an east-west direction and a north-south direction to generate a wind-convergence image, the wind-convergence image is sharpened and stored in the storage unit, and the wind-convergence image has noise eliminated and is stored in the storage unit.

2. The weather forecasting system according to claim 1, wherein the first calculation unit is configured to perform a process for determining presence of the local downpour by calculating occurrence probability of the local downpour only when determination is made that the air is unstable based on the measured weather information.

3. The weather forecasting system according to claim 1 wherein
weighting is performed to each of the wind-condition information and the measured weather information, and
the weighting to the wind-condition information is set to be heavier than the weighting to the measured weather information.

4. The weather forecasting system according to claim 1, wherein the wind-condition information is divided into regions smaller than regions divided in the measured weather information for acquisition, and forecast information is output for each of the small regions.

5. The weather forecasting system according to claim 1, further comprising:
a second calculation unit, the second calculation unit compares the predicted weather information generated by the first calculation unit with the weather phenomenon that actually occurs to generate prediction accuracy information,
wherein the storage unit stores the prediction accuracy information generated by the second calculation unit.

6. A database system for predicting a weather phenomenon in a prediction target region, the database system comprising:
a storage unit configured to store wind-condition pattern information and measured weather information observed in the prediction target region, the wind-condition pattern information is information created based on wind-condition distribution information that is in the prediction target region and that is obtained by an air observation system using Doppler LIDAR, the wind-condition pattern information and the measured weather information are associated with each other and stored in the storage unit;
a first calculation unit, the first calculation unit configured to compare wind-condition pattern information at a time of prediction with the wind-condition pattern information stored in the storage unit to extract the wind-condition pattern information that is stored in the storage unit and that is relevant to the wind-condition pattern information at a time of prediction, and based on the measured weather information associated with the extracted wind-condition pattern information, the first calculation unit generates predicted weather information; and
a second calculation unit, the second calculation unit compares the predicted weather information generated by the first calculation unit with the weather phenomenon that actually occurs to generate prediction accuracy information,
wherein the storage unit stores the prediction accuracy information generated by the second calculation unit.

7. The database system according to claim 6, wherein
the storage unit stores a Bayesian network including at least the wind-condition pattern information, nodes with the measured weather information observed in the prediction target region and the prediction target weather phenomenon as random variables, priori probabilities or posteriori probabilities regarding the random variables of the nodes, and a link between the nodes, and
the first calculation unit generates the predicted weather information based on the wind-condition pattern information at a time of prediction and the posteriori probabilities extracted from conditional probability tables held in the nodes with the prediction target weather phenomenon as the random variables.

8. A weather forecasting system comprising:
the database system according to claim 7; and
an air observation system comprising: a plurality of Doppler LIDARs installed with a space from each other; and
a calculation unit configured to generate wind-condition distribution information in an observation region based on an observation result made by the Doppler LIDARs;
wherein the wind-condition distribution information in the prediction target region used by the database system is the wind-condition distribution information generated by the air observation system.

9. A weather information providing system comprising:
the database system according to claim 7; and
a reception terminal,
wherein the database system further includes an output unit,
the output unit sends the predicted weather information in the prediction target region and life information associated with the predicted weather information, and
the reception terminal receives the predicted weather information and the life information which are sent from the output unit.

10. The weather information providing system according to claim 9, further comprising an air observation system comprising: a plurality of Doppler LIDARs installed with a space from each other; and
a calculation unit configured to generate wind-condition distribution information in an observation region based on an observation result made by the Doppler LIDARs.

11. The database system according to claim 6, wherein
the storage unit further stores corresponding potential temperature pattern information,
the corresponding potential temperature pattern information is information created based on altitude distribution of corresponding potential temperature in the prediction target region,
the corresponding potential temperature pattern information and the measured weather information are associated with each other and are stored in the storage unit,
the first calculation unit compares corresponding potential temperature pattern information at a time of prediction with the corresponding potential temperature pattern information stored in the storage unit to further extract the corresponding potential temperature pattern information that is stored in the storage unit and that is relevant to the corresponding potential temperature pattern information at a time of prediction,
the first calculation unit generates the predicted weather information based on the measured weather information associated with the extracted wind-condition pattern information and the measured weather information associated with the extracted corresponding potential temperature pattern information.

12. The database system according to claim 6, wherein the air observation system is an air observation system including a plurality of the Doppler LIDARs installed with a space from each other, and a calculation unit configured to generate the wind-condition distribution information in the prediction target region based on an observation result by the Doppler LIDARs.

13. The database system according to claim 6, wherein
the wind-condition pattern information is wind-convergence pattern information and wind-speed pattern information,
the measured weather information is at least rainfall information, and
the predicted weather information is information on predicted local rainfall.

14. A computer program for causing a computer to function as the database system according to claim 6.

* * * * *